United States Patent
Miyazaki et al.

(10) Patent No.: US 6,636,631 B2
(45) Date of Patent: *Oct. 21, 2003

(54) OPTICAL CHARACTER READING METHOD AND SYSTEM FOR A DOCUMENT WITH RULED LINES AND ITS APPLICATION

(75) Inventors: Keiichi Miyazaki, Yokohama (JP); Masato Minami, Kawasaki (JP); Toshiyuki Kouda, Yokohama (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,546

(22) Filed: Jun. 4, 1999

(65) Prior Publication Data

US 2003/0123732 A1 Jul. 3, 2003

(30) Foreign Application Priority Data

Jun. 4, 1998 (JP) ............................................. 10-156295

(51) Int. Cl.[7] ............................. G06K 9/00; G06K 9/66; G06K 9/48; G06K 9/68; G06K 90/62
(52) U.S. Cl. ..................... 382/187; 382/194; 382/198; 382/219; 382/228; 382/161
(58) Field of Search .................................. 382/185, 186, 382/187, 190, 192, 193, 194, 197, 198, 199, 173, 176, 177, 178, 179, 183, 135, 137, 138, 156, 159, 161, 224, 228, 229, 218, 219; 235/462.01; 706/20

(56) References Cited

U.S. PATENT DOCUMENTS

| | | | | |
|---|---|---|---|---|
| 4,802,230 A | * | 1/1989 | Horowitz | 382/199 |
| 5,675,665 A | * | 10/1997 | Lyon | 382/229 |
| 5,802,207 A | * | 9/1998 | Huang | 382/224 |
| 5,805,730 A | * | 9/1998 | Yaeger et al. | 382/228 |
| 5,896,464 A | * | 4/1999 | Horiuchi et al. | 382/178 |
| 5,940,535 A | * | 8/1999 | Huang | 382/201 |
| 6,041,141 A | * | 3/2000 | Yamamoto et al. | 382/231 |

FOREIGN PATENT DOCUMENTS

WO WO 9320533 10/1993

OTHER PUBLICATIONS

"A Handwritten Character Recognition System Using Modified Mahalanobis Distance" by N Kato et al; The Transactions of the Institute of Electronics, Information and Communication Engineerings; D–II vol. J79 No. 1; Jan., 1996; pp. 45–52 (w/partial English translation).

(List continued on next page.)

*Primary Examiner*—Mehrdad Dastouri
(74) *Attorney, Agent, or Firm*—Louis Woo

(57) ABSTRACT

A method of recognizing characters of a document including ruled lines. After separating the characters from the ruled lines, a bounding box and a corresponding character pattern are extracted for each character (hereinafter, "the character"). Contour information and ground (white pel area) information are extracted as fundamental features from the character pattern. Various statistical features are extracted based on the fundamental features. Various structural features are extracted based on the fundamental features and the character pattern. On the basis of the extracted statistical features, some candidates for the character and corresponding degrees of similarity are found to provide at least such one of the candidates as has largest degree(s) of similarity and degree(s) of similarity associated with the provided candidate(s). A final candidate for the character pattern is output based on the provided candidate(s), the provided degree(s) of similarity, the structural features and the bounding box.

27 Claims, 29 Drawing Sheets

OTHER PUBLICATIONS

"Recognition of Unconstrained Handwritten Characters" by Y. Kurosawa et al; Toshiba Review vol. 41 No. 12; 1986; pp. 1012–1015 (w/Eng. abstract).

Yuan Y. Tang et al. "Offline Recognition of Chinese Handwriting by Multifeature and Multilevel Classification" IEEE Transactions On Pattern Analysis and Machine Intelligence, IEEE Inc. New York, US, vol. 20, No. 5, May 1, 1998, pp. 556–561, XP000774138, ISSN: 0162–8828.

R. G. Casey et al. "Intelligent Forms Processing" IBM Systems Journal, IBM Corp. Armonk, New York, US, vol. 29, No. 3, 1990, pp. 435–450, XP000265375, ISSN: 0018–8670.

K. Notbohm et al. "Automatische Ziffernerkennung In Einer Briefverteilmaschine" Nachrichtentechnik Elektronik, Veb Verlage Technik, Berlin, DE, vol. 36, No. 12, 1986, pp. 472–476, XP000196999, ISSN: 0323–4657.

O.D. Trier et al. "Feature Extraction Methods For Character Recognition—A Survey" Pattern Recognition, Pergamon Press Inc. Elmsford, N.Y., US, vol. 29, No. 4, Apr. 1, 1996, pp. 641–662, XP004006579, ISSN: 0031–3203.

* cited by examiner

- THE SMALL SQUARES ARE POSSIBLE PEL POINTS.
- THE DOTTED SQUARES ARE CONTOUR PELS THAT CONSTITUTE THE CONTOUR OF THE CHARACTER PATTERN "3".
- THE DIGIT ATTACHED TO EACH DOT IN UPPER PART IS A DIRECTION CODE INDICATIVE OF THE DIRECTION OF THE PEL WITH THE DOT.

| THE NUMBER OF CONTOUR PELS WITH CDC=0 | THE NUMBER OF CONTOUR PELS WITH CDC=1 | ... | THE NUMBER OF CONTOUR PELS WITH CDC=7 |
|---|---|---|---|
| $N0_A$ \| $N0_B$ <br> $N0_D$ \| $N0_C$ | $N1_A$ \| $N1_B$ <br> $N1_D$ \| $N1_C$ | ... | $N7_A$ \| $N7_B$ <br> $N7_D$ \| $N7_C$ |

$0 \leq \gamma < \beta < \alpha$

THE DIRECTIONS OF SCANNING BY THE OUTER-PEL-COUNT-BY-CD CALCULATOR 35 AND THE MARGIN SUM CALCULATOR 37

(a) (b) (c) (d) (e)

(a) (b)

FIG. 24A
| - | - | 7 | 0 | 0 | 1 | - |
|---|---|---|---|---|---|---|
| - | 6 | 6 |   |   | 2 | 3 |
| 5 | 6 |   |   |   |   | 4 |
| 4 |   |   |   |   |   | 4 |
| 4 |   |   |   | 7 | 6 | 5 |
| 3 | 0 | 1 | 0 | 0 | 6 | - |
| - | - | - | 0 | - | - | - |
FIG. 24B
| - | - | 7 | 0 | 0 | 1 | - |
|---|---|---|---|---|---|---|
| - | 6 | 6 | + | + | 2 | 3 |
| 5 | 6 | + | + | + | + | 4 |
| 4 | + | + | + | + | + | 4 |
| 4 | + | + | + | + | 6 | 5 |
| 3 | 0 | 1 | 0 | 7 | 6 | - |
| - | - | - | 0 | - | - | - |
FIG. 25
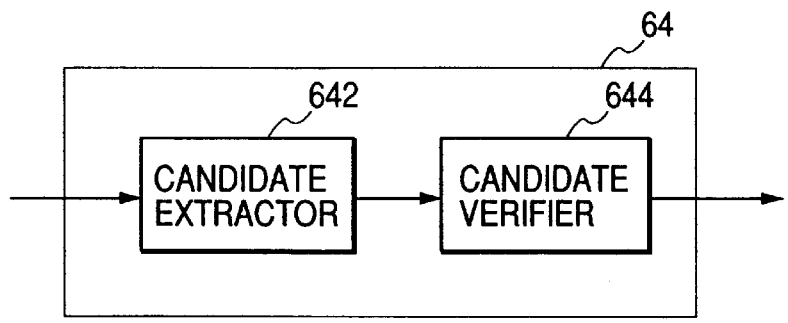
FIG. 26
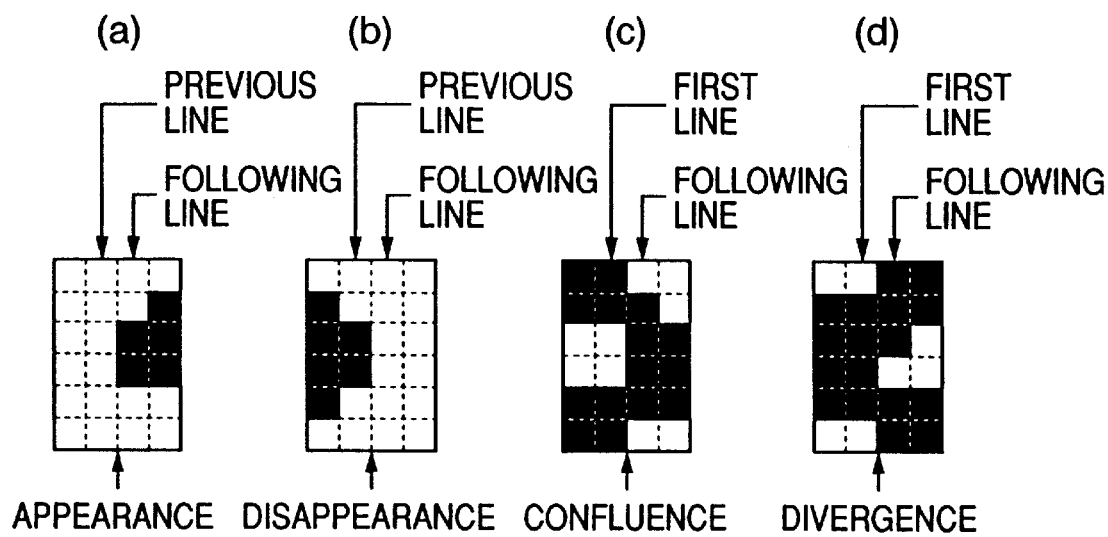
(a) APPEARANCE — PREVIOUS LINE, FOLLOWING LINE
(b) DISAPPEARANCE — PREVIOUS LINE, FOLLOWING LINE
(c) CONFLUENCE — FIRST LINE, FOLLOWING LINE
(d) DIVERGENCE — FIRST LINE, FOLLOWING LINE FIG. 33
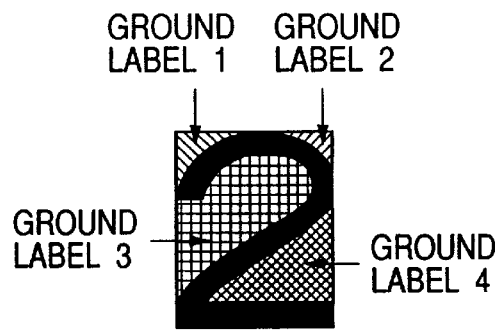
GROUND LABEL 1  GROUND LABEL 2
GROUND LABEL 3  GROUND LABEL 4
FIG. 34
| ₋701 | ₋702 | ₋704 | |
|------|------|------|------|
| ID | CONFUSING CATEGORY FIRST CHAR/SECOND CHAR | DISCRIMINATION RULE | . . . |
FIG. 35A
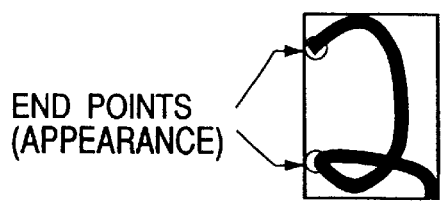
END POINTS (APPEARANCE)
FIG. 35B
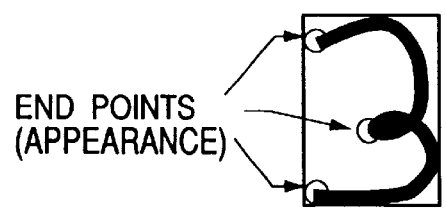
END POINTS (APPEARANCE)

FIG. 40

| DOCUMENT TYPE ID | ABC1234 | ABC2345 | ACC3456 | BBB4567 | ... |
|---|---|---|---|---|---|
| RULED LINE (OR FRAME) STRUCTURE | | | | | ... |
| CHARACTER READ AREA | | | | | ... |
| POSSIBLE CHARACTER STRINGS | Boston, Mass. Austin, Texas Denver, Colorado .... | ... | ... | ... | ... |

| ID | CONFUSING CATEGORY FIRST CHAR/SECOND CHAR | CORRECTION AMOUNT FINDING RULE | . . . |

701 / 702 / 704a

OPTICAL CHARACTER READING METHOD AND SYSTEM FOR A DOCUMENT WITH RULED LINES AND ITS APPLICATION

BACKGROUND OF THE INVENTION

1. Field of the Invention

The invention generally relates to an optical character reader (OCR) and more particularly to a method of and a system for recognizing printed and handwritten characters in a document or a filled-in form.

2. Description of the Prior Art

Similarity calculation techniques based on distance measures are generally used as the similarity calculation techniques in prior art OCR systems. The distance measures are roughly classified into distance measures with respect to the dimension of each of the pattern vectors and distance measures with regard to the distribution of all dimensions. It is known that similarity calculation techniques based on the latter distance measure are more effective as indicated in; N. Kato et al., "A Handwritten Character Recognition System Using Modified Mahalanobis Distance," Trans. IEICE (The Institute of Electronics, Information and Communication Engineers) Japan, Vol. J79-D-II, No. 1, January 1996, pp. 45–52 (which is hereby incorporated by reference). Among others, the multiple similarity method is one of practically used and popular similarity calculation techniques.

The multiple similarity method first performs a principal component analysis on the distribution, in a pattern space, of training character patterns included in a character category to obtain N eigen values $\lambda i$ and N eigen vectors $\psi i$, where $i=1, 2, \ldots, N$. For an input character pattern vector f, the similarity S is calculated by using the eigen vectors $\psi i$ as reference according to the following equation:

$$S_j = \left( \sum_{i=1}^{N} \frac{\lambda_{j,i}}{\lambda_{j,i}} \cdot \frac{(\psi_{j,i}, f)^2}{|(\psi)_{j,i}|^2 \cdot |f|^2} \right)^{\frac{1}{2}}.$$

The largest similarity and the second largest similarity are compared with each other to determine whether to reject the calculation result. If not (the calculation result should not be rejected), the category of the largest similarity is generally used as the recognition result.

A contour structure matching method is one of character recognition methods using structural features in a conventional OCR. The contour structure matching method is described in Y. Kurosawa et al, "Recognition of Unconstrained Handwritten characters," Toshiba Review Vol.41, No.12, pp.1012–1055 (1986).

In this method, a freeman code chain coded in eight directions is extracted as initial stage feature data in each input character pattern. The extracted code chain is smoothed and divided by the curvature into couture segments. The divided segments or couture segments are classified into three kinds, i.e., convex segments, linear segments and concave segments. Each of the contour segments is given attribute information such as the length, the radius, the position, the direction of the contour segment.

A database of this method stores, for each character, a description of reference pattern comprising a sequence of contour segments each having above-mentioned attribute information. Each data of the attribute information has an upper limit and a lower limit set. The recognition of an input pattern is performed by examining correspondence between the segments of the input pattern and the segments of a reference pattern.

Y. Kurosawa et al also reported in the above-cited document that a combination of the contour structure matching method and the multiple similarity method provided a much lower rejection rate as compared with cases of using only one of the contour structure matching method and the multiple similarity method.

If a recognition method that only uses statistical characteristics obtained through a principal component analysis is used in a OCR system, it will be difficult for such systems to discriminate similar categories the human would easily discriminate because structural differences in the character pattern are not taken into account in the recognition process. On the other hand, a recognition method that only uses structural characteristics is disadvantageously inefficient in creating a reference pattern database.

Further, if handwritten characters written on an entry form with ruled lines are to be optically read and recognized as they are (without the ruled lines dropped out), character extraction errors tend to occur. For example, a character may couple with a part of a ruled line or may lose a part of itself due to a contact with the ruled line or a crossing the ruled line. A correction of an amount of money may cause a part of a corrected portion or a correction seal impression (a small seal impression stamped by a corrector) to be extracted as a part of the character. In such a case, judging whether to reject the extracted pattern only by the degree of similarity disadvantageously results in an erroneous recognition.

SUMMARY OF THE INVENTION

Accordingly, it is an object of the invention to provide a character recognition method and system that exhibits an improved recognition performance by adopting both of a statistical characteristic-based recognition method and a structural characteristic-based recognition method such that the above-mentioned problems are solved. Specifically, an inventive character recognition method and system mainly uses a recognition method based on statistical characteristics but uses structural characteristics only for discriminating similar categories that would invite errors with a recognition method based on statistical characteristics.

According to an aspect of the invention, a method of recognizing characters of a document including ruled lines in a system having means for reading the document and storing read data as an input image of pels. In this method, the characters are separated from the ruled lines. For each of the characters, a bounding box and a corresponding character pattern are extracted. A bounding box is a box that contains a character with four sides thereof contacting the character. Since the following process is executed for each character, definite articles are used instead of "each" here. Contour information and ground information are extracted as fundamental features from the character pattern. Various statistical features are extracted on the basis of the fundamental features. Various structural features are extracted on the basis of the fundamental features and the character pattern. On the basis of the extracted statistical features, some candidates for the character and corresponding degrees of similarity are found to provide at least such one of the candidates as has largest degree of similarity and degree(s) of similarity associated with the provided candidate(s). A final candidate for the character pattern is output on the basis of the provided candidate(s), the provided degree(s) of similarity, the structural features and the bounding box.

According to another aspect of the invention, a system for recognizing characters of a document including ruled lines is provided. The system comprises a scanner and digitizer for reading the document and storing read data as an input image of pels; a character extractor for separating the characters from the ruled lines and, for each character, extracting a bounding box and a corresponding character pattern defined by the bounding box; a fundamental feature extractor for extracting contour information and ground information as fundamental features from each character pattern; a statistical feature extractor for extracting at least one kind of statistical features on the basis of the fundamental features; a statistical feature-based recognizer for, on the basis of the extracted statistical features, finding some number of candidates for the character and corresponding degrees of similarity to provide at least such one of the candidates as has largest degree(s) of similarity and degree(s) of similarity associated with the provided candidate(s); a structural feature extractor for extracting at least one kind of structural features on the basis of the fundamental features and each character pattern; a structural feature-based recognizer for providing a final candidate for each character pattern on the basis of the provided candidate(s), the provided degree(s) of similarity, the structural features and each bounding box.

BRIEF DESCRIPTION OF THE DRAWING

The features and advantages of the present invention will be apparent from the following description of an exemplary embodiment of the invention and the accompanying drawing, in which:

FIGS. 24A and 24B are diagram showing exemplary character patterns that contains a stroke loop and that does not contain a loop;

FIG. 25 is a diagram showing an arrangement of the end point & intersecting point extractor 64;

FIG. 26 is a diagram showing examples of "appearance", "disappearance", "confluence" and "divergence";

FIG. 33 is a diagram showing an exemplary way of the ground label extractor 67 extracting ground labels in a series of left-to-right scans from top row to bottom row;

FIG. 34 is a diagram showing an exemplary structure of the confusing character databases 78 and 79;

FIGS. 35 through 38 are diagrams showing examples of confusing character patterns;

FIG. 40 is a diagram showing an example of the document table 120;

FIG. 45 is a diagram showing an exemplary structure of the confusing character databases 78a and 79a;

FIG. 46 is a block diagram showing an arrangement of a character pattern extractor 10a in accordance with another illustrative embodiment of the invention;

Throughout the drawing, the same elements when shown in more than one figure are designated by the same reference numerals.

DETAILED DESCRIPTION OF THE PREFERRED EMBODIMENTS

Embodiment I

Figure 1:
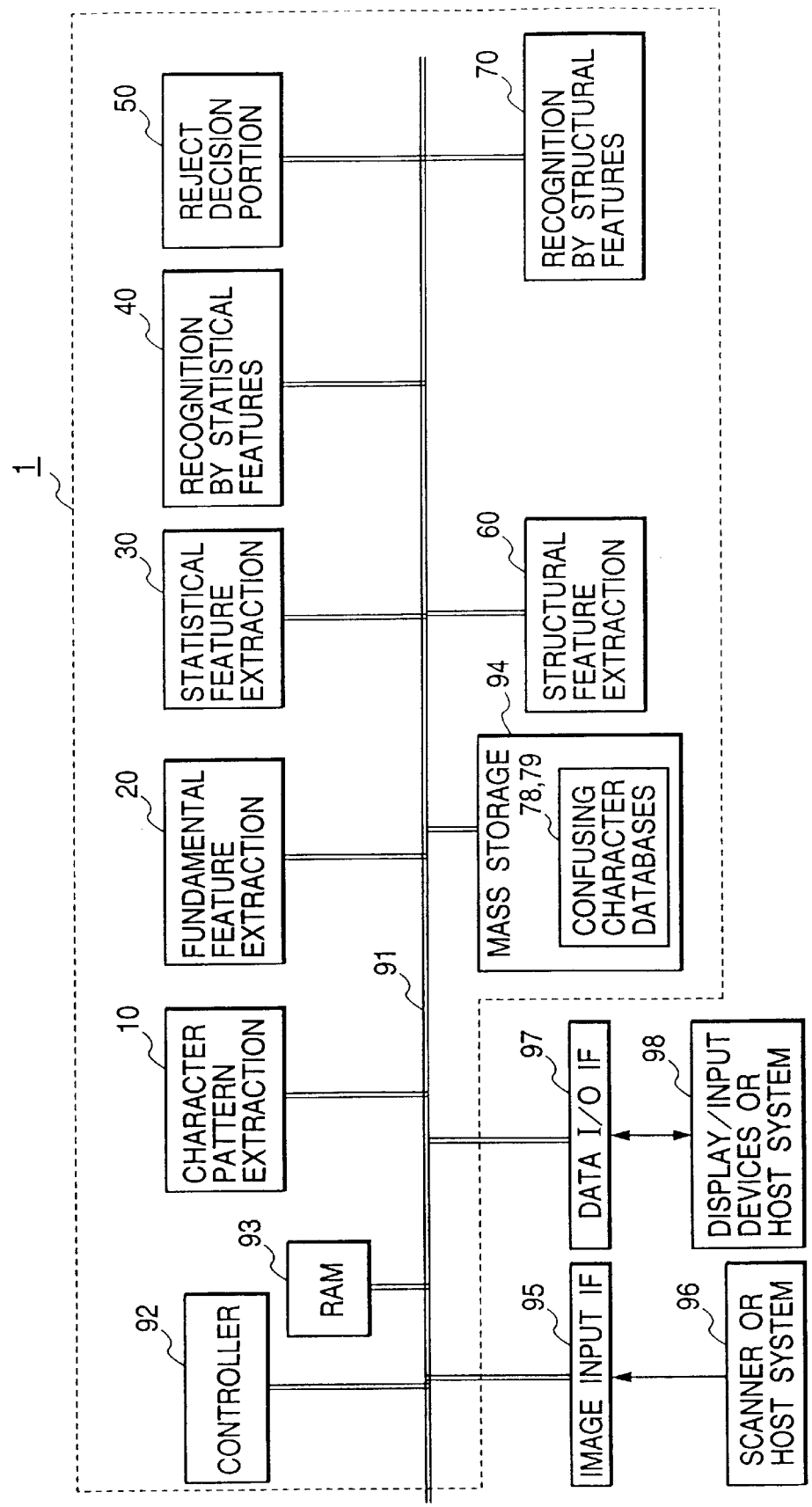
FIG. 1 is a schematic block diagram showing an arrangement of a device incorporating a character recognition system 1 which recognizes characters printed or handwritten on an entry form with ruled lines in accordance with a first illustrative embodiment of the invention.
Figure 2:
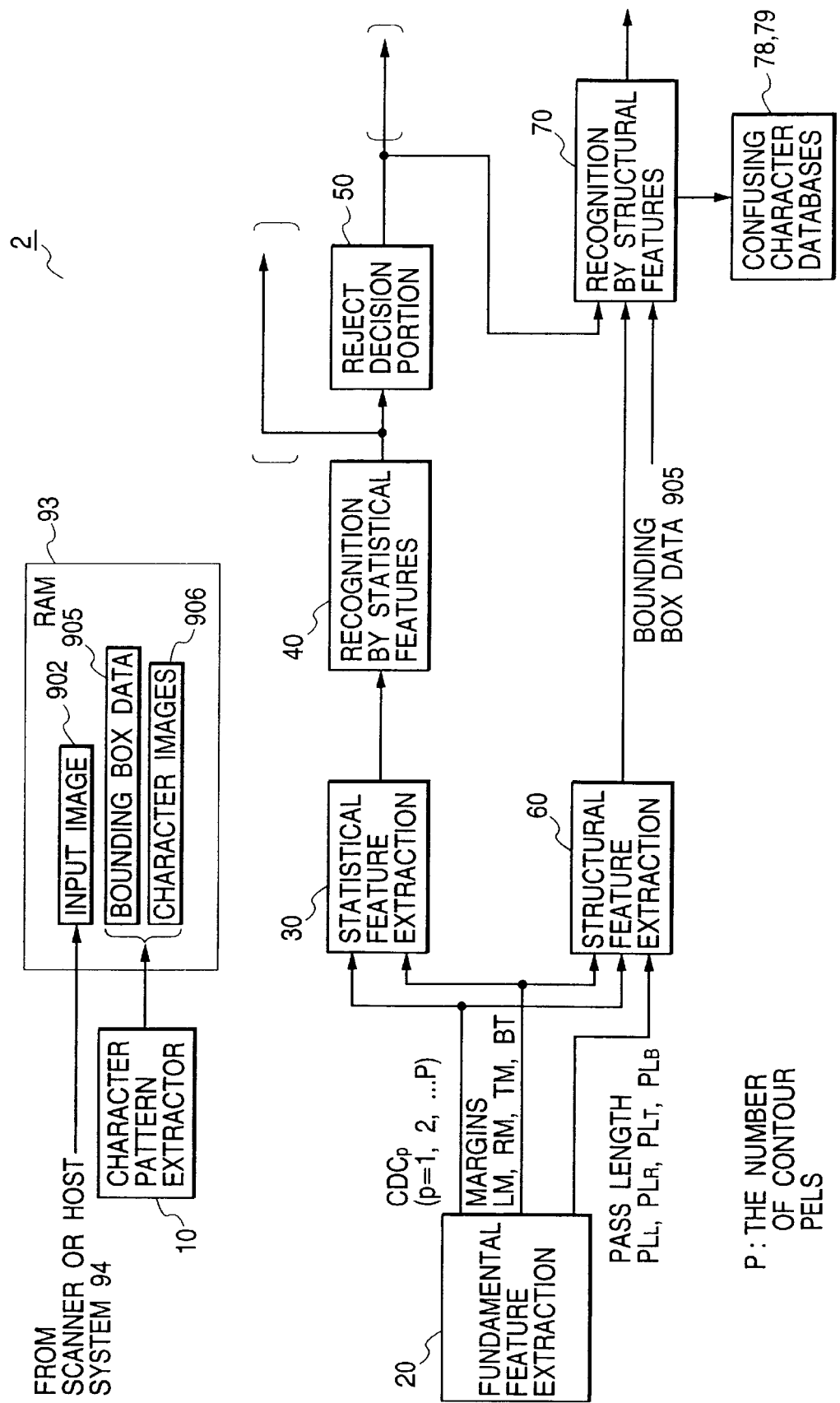
FIG. 2 is a flow diagram showing an operation and data flows of the character recognition system 1.

FIG. 1 is a schematic block diagram showing an arrangement of a device incorporating a character recognition system 1 which recognizes characters printed or handwritten on an entry form with ruled lines in accordance with a first illustrative embodiment of the invention. FIG. 2 is a flow diagram showing an operation and data flows of the character recognition system 1. The device of FIG. 1 may be a general-purpose computer or a specific-purpose device or system. In FIG. 1, the device comprises an inventive character recognition system 1 configured along a bus 91; an image input interface (IF) 95 through which an optically read image including character patterns is taken in into the system 1; a scanner (or a host system provided with a scanner) 96; a data input and output (I/O) interface 97 for communicating various data such as commands to the system 1 and operation results (i.e., recognized characters); and display/input devices (or the above-mentioned host system) 98. The interfaces 95 and 97 are coupled with the bus 91 of the system 1.

The character recognition system 1 comprises a controller 92 which preferably includes a central processing unit (not shown) controls the overall operation of the system 1; a random access memory (RAM) 93 for temporarily storing various data used in the operation; and a mass storage 94 for storing programs and data for use in the operation, which constitute a computer. In FIGS. 1 and 2, the system 1 further comprises a character pattern extractor 10; a fundamental feature extractor 20; a statistical feature extractor 30; a recognizer 40 based on statistical features (hereinafter referred to as "statistical feature-based recognizer"), which recognizer comprises a hierarchical neural network in this specific embodiment) to output at least one candidate and the likelihood (e.g., the degree of similarity); and a reject decision portion 50 for providing a signal indicative of the validity of the recognition result, which constitute a character recognition subsystem based on statistical features and a neural network. The system 1 further comprises a structural feature extractor 60 and a recognizer 70 based on structural features (which, together with the character pattern extractor 10 and the fundamental feature extractor 20, constitute a character recognition subsystem based on structural features). In FIG. 2, each arrow that connects a first element with second element(s) indicates that the output (or operation results) of the first element is used by the second element(s). In other words, this mean that the output of the first element is not necessarily passed directly to the second element(s) but is stored in the RAM 93 once and then read out by the second element(s). For example, the character extractor 10 stores data 905 of the extracted bounding box and the character image extracted by using the data 905 in RAM 92. The bounding box data 905 and the character images 906 stored in RAM 92 are read out and used by the elements 20, 30, 60 and 70 in respective timing.

It is noted that the character recognition system 1 is not a simple combination of a statistical feature-based character recognition system and a structural feature-based character recognition system but is so configured that the above-mentioned statistical feature-based character recognition subsystem and structural feature-based character recognition subsystem share the elements 10 and 20.

The character pattern extractor 10 separates a character sequence pattern from the input image which includes a character sequence pattern and ruled lines and extracts, from the character sequence pattern, a bounding box of each of the character patterns. The elements 20, 30, 40, 50, 60 and 70 process each character one by one by using the bounding box data of the character. For the purpose of simplicity, a character being processed, a bounding box of the character, the character pattern (or image) of the character are hereinafter referred to as "the (current) character", "the bounding box (data)" and "the character pattern".

FIGS. 3 through 6 are block diagrams showing, in detail, exemplary arrangements of the fundamental feature extractor 20, the statistical feature extractor 30, the structural feature extractor 60 and the structural feature-based recognizer 70, respectively.

Figure 3:
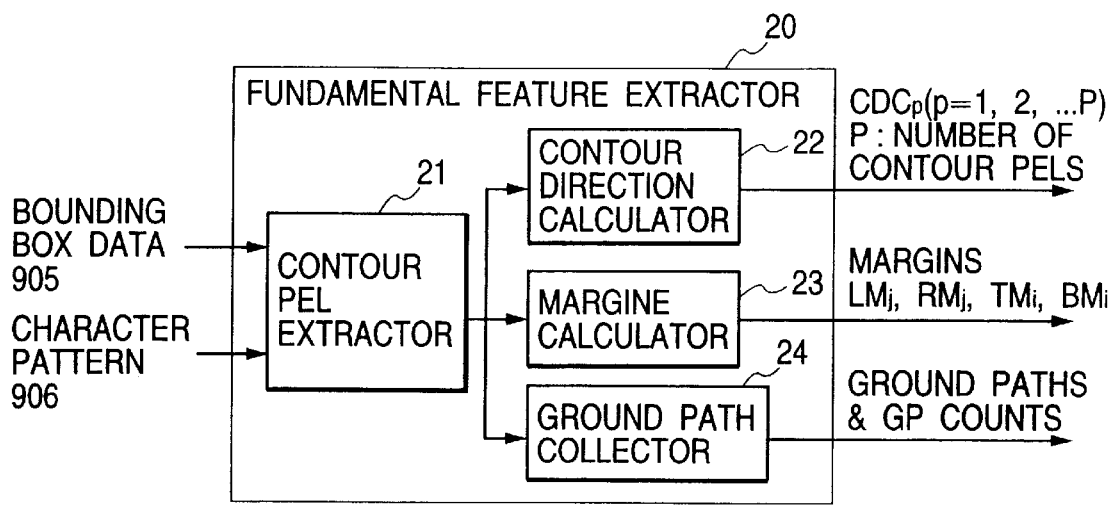
FIGS. 3 through 6 are block diagrams showing, in detail, exemplary arrangements of the fundamental feature extractor 20, the statistical feature extractor 30, the structural feature extractor 60 and the structural feature-based recognizer 70, respectively.

In FIG. 3, the fundamental feature extractor 20 comprises a contour pel (pixel) extractor 21 for generating a contour image of each character pattern by using the bounding box data extracted by the character pattern extractor 10; a contour direction calculator 22; a margin calculator 23 and a ground path collector 24.

Figure 4:
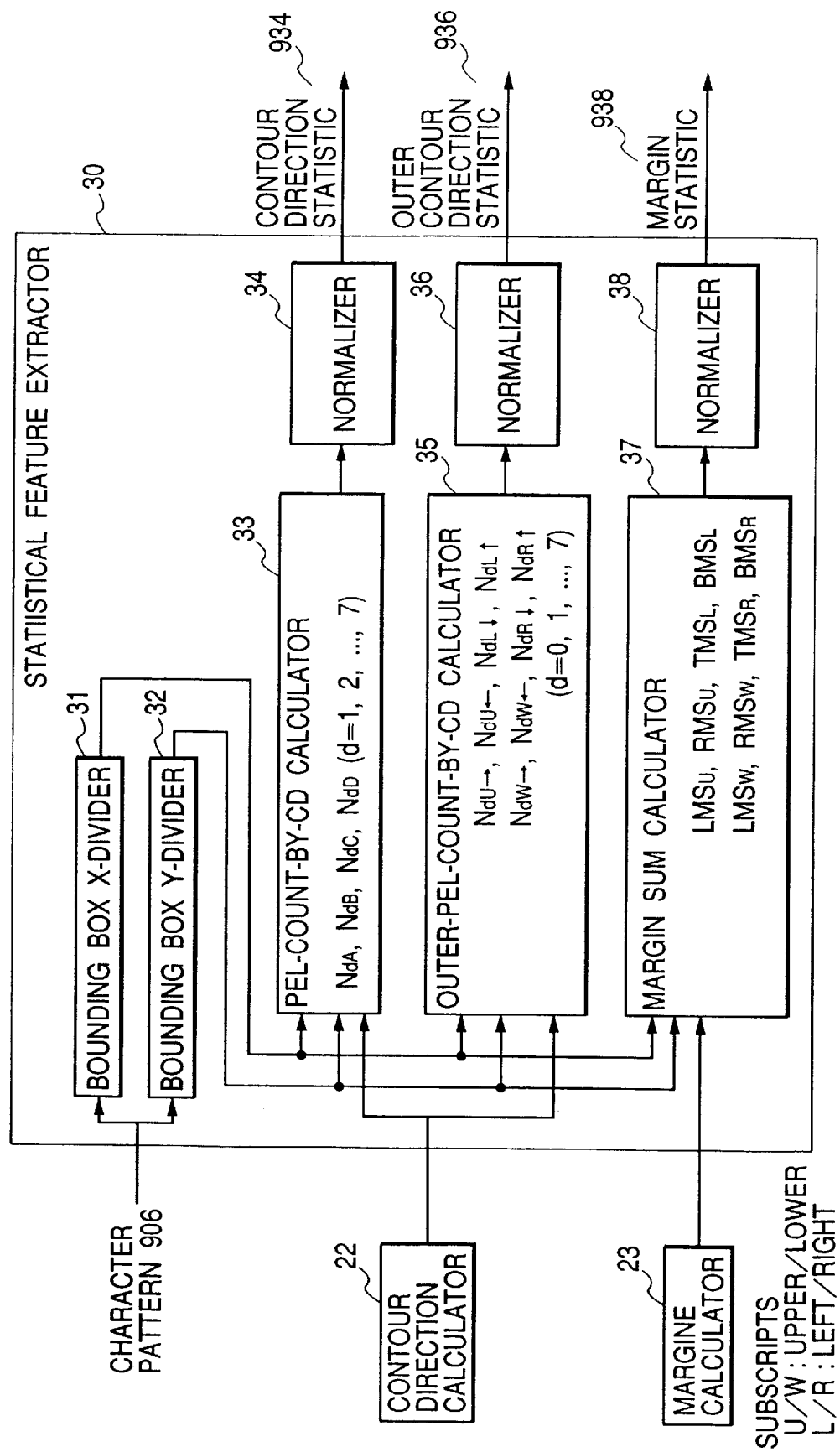

In FIG. 4, the statistical feature extractor 30 comprises a bounding box x-divider 31 for dividing the bounding box into an upper and a lower block that have the same number of pels; a bounding box y-divider 31 for dividing the bounding box into a left and a right block that have the same number of pels; a pel-count-by-CD (contour direction) calculator 33; an outer-pel-count-by-CD calculator 33; margin sum calculator 37; and three normalizers 34, 36 and 38 for normalizing each output of the calculator 33, each output of the calculator 35 and each output of the calculator 37, respectively.

Figure 5:
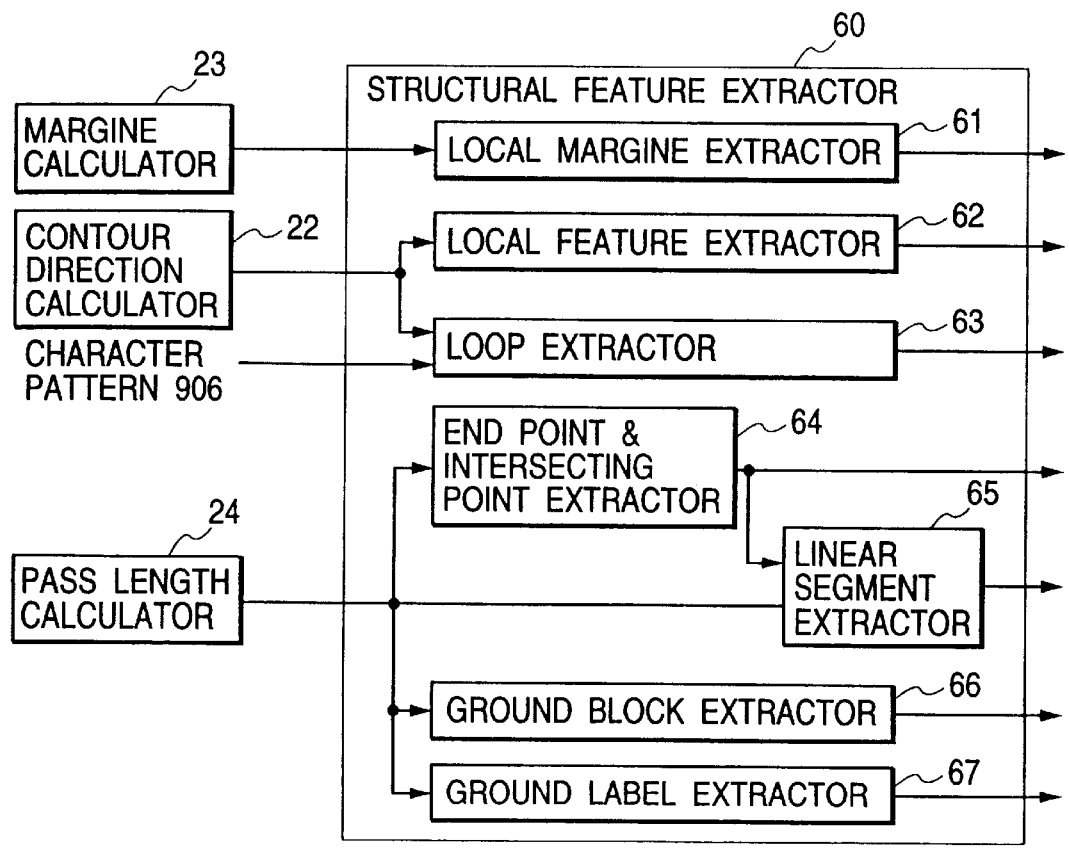

In FIG. 5, the structural feature extractor 60 comprises a local margin extractor 61; a local feature extractor 62; a loop extractor 63; a end point and intersecting point extractor 64; a linear (contour) segment extractor 65; a ground block extractor 66; and a ground label extractor 67.

Figure 6:
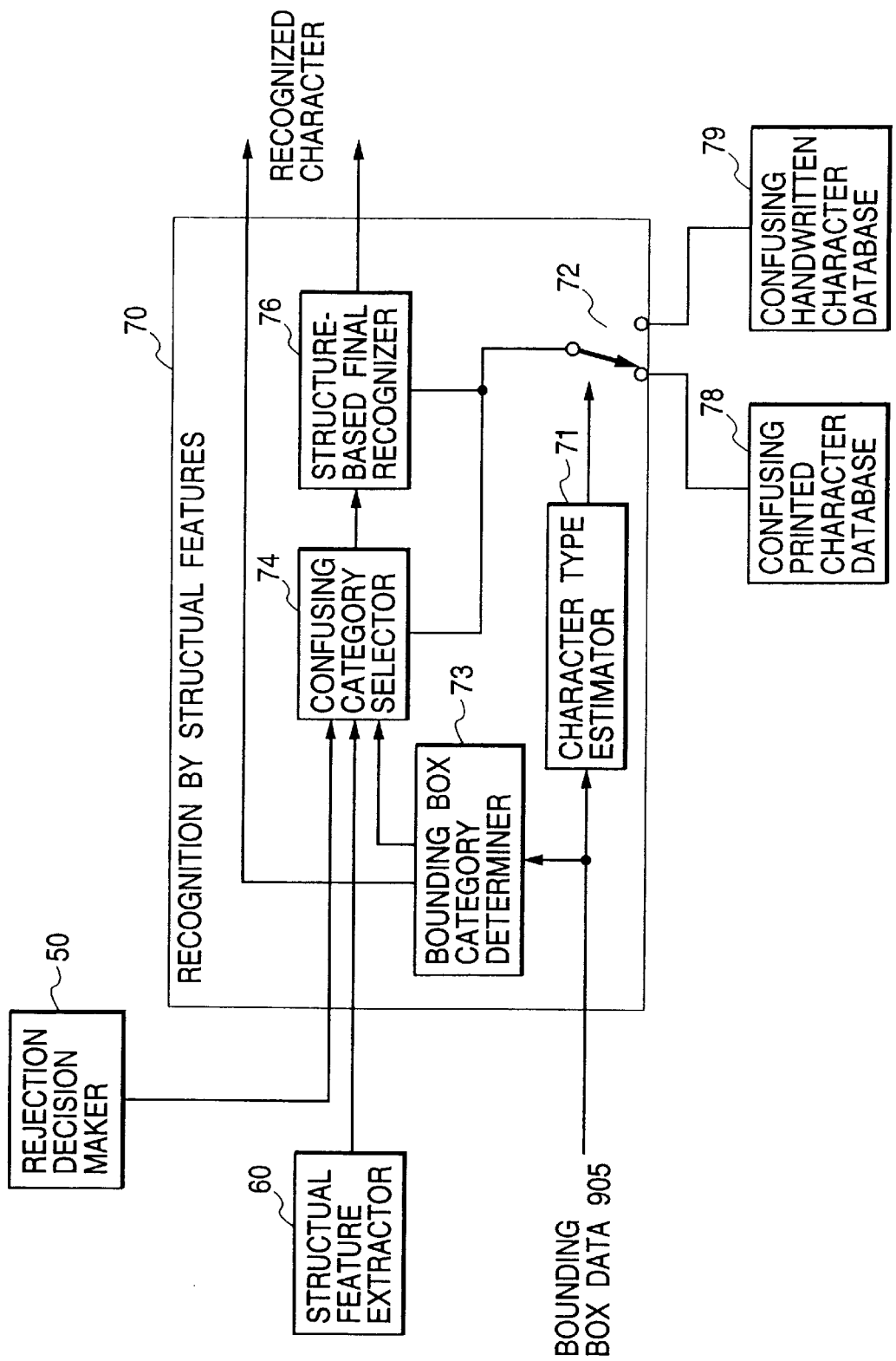

In FIG. 6, the structural feature-based recognizer 70 uses two databases: a confusing printed character database 78 and a confusing handwritten character database 79, which are preferably stored in the mass storage 94. The structural feature-based recognizer 70 comprises a bounding box category determiner 73; a character type estimator 71 for deciding whether the character is printed or handwritten; a database selector 72 controlled by the character type estimator 71; a confusing category selector 74 for selecting a confusing category associated with the output character(s)

from one of the confusing printed and handwritten character databases 78 and 79 which is selected by the database selector 72; and a structure-based final recognizer 76 for recognizing the current character based on recognizing rules contained in the record selected by the confusing category selector 74.

It is noted that the structural feature-based recognizer 70 executes a structural feature-based recognition operation only when the current character can not be recognized from the output characters from the statistical feature-based recognizer 40 and the bounding box category determiner 73 and the output characters from the statistical feature-based recognizer 40 are included in one of the categories stored in a confusing printed or handwritten character database 78 or 79.

Figure 7:
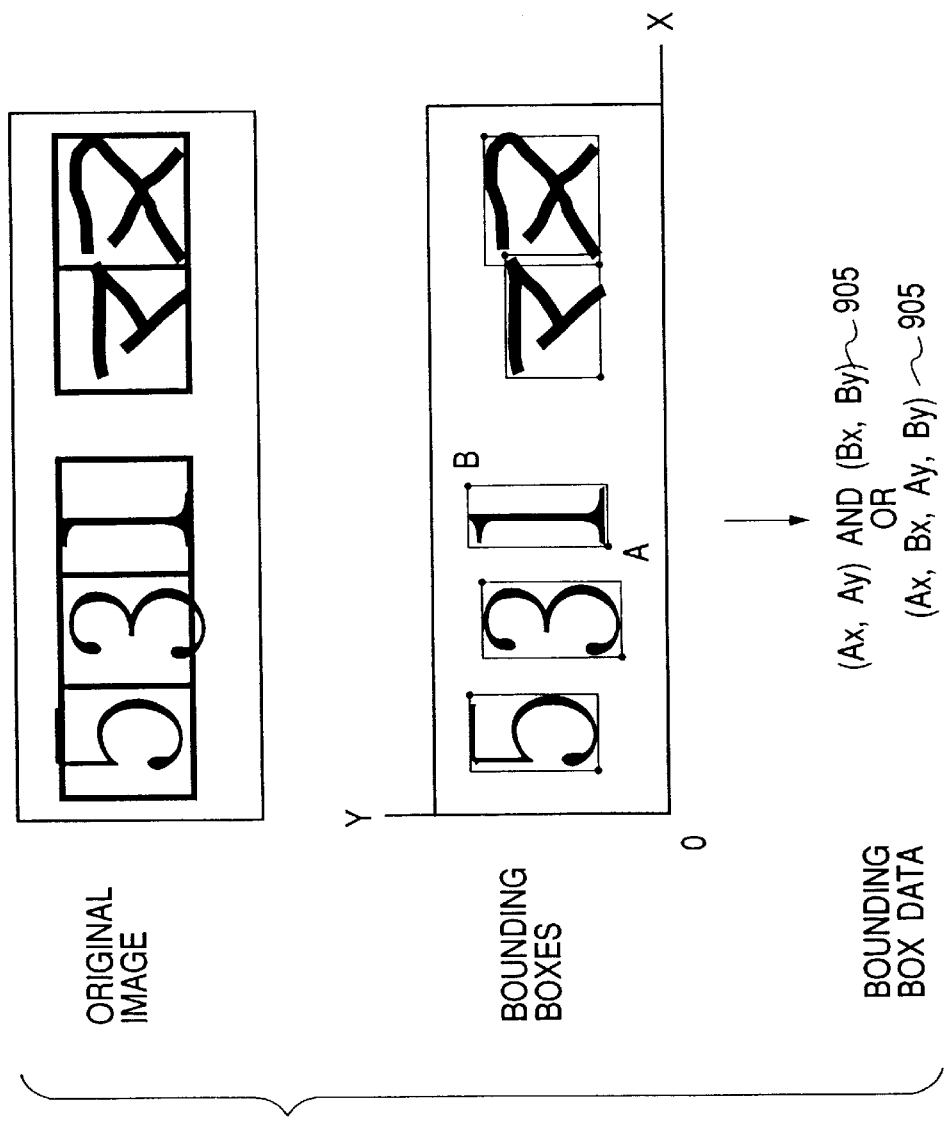
FIG. 7 is a diagram illustrating an exemplary operation of the character extractor 10 of FIG. 2.

In operation, a document including ruled lines and character sequences is optically read and the read image is stored in RAM 93. The stored original image may be multi-level image. The character extractor 10 first separates the character sequences from the ruled lines and digitizing the separated character image into a two-level (i.e., black and white) image. The character extractor 10 determines a bounding box for each of the characters and stores bounding box data 905 defining the determined bounding box, e.g., XY coordinates of two corner points (say, A and B) on one diagonal of the bounding box, say, (Ax, Ay) and (Bx, By) as shown in FIG. 7. The bounding box data 905 may be in any other suitable form like (Ax, Bx, Ay, By). The character extractor 10 further extracts a character pattern of each character by using the bounding box data 905 and stores the character pattern 906 in RAM 93.

Figure 8:
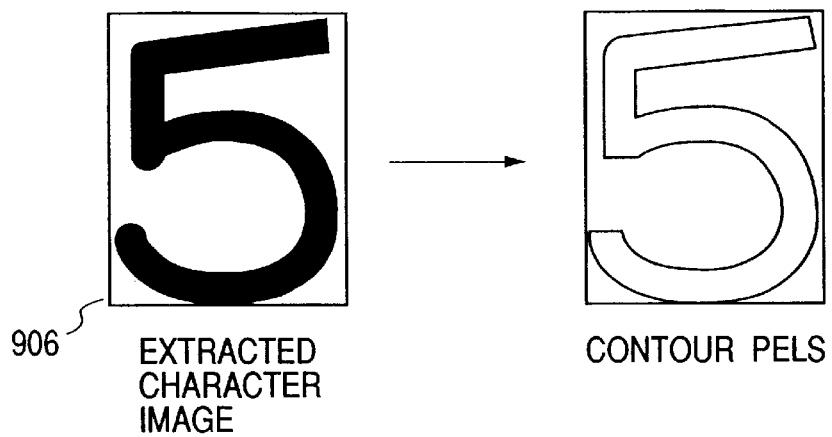
FIG. 8 is a diagram illustrating an exemplary operation of the contour pel extractor 21 of FIG. 3.

Referring now to FIG. 3, in FUNDAMENTAL FEATURE EXTRACTOR 20, the contour pel extractor 21 extracts contour pels constituting the contour that defines the character pattern as shown in FIG. 8. The extraction of contour pels is achieved in the following way: if any black pel is bounded in every direction (i.e., horizontally, vertically and diagonally) only by black pels, then the black pel bounded by all black pels is changed to a white pel; this operation is repeated as long as possible; and the remaining pels are contour pels.

Figure 9:
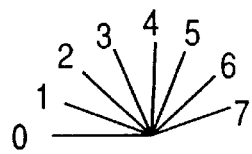
FIG. 9 is a diagram showing an example of predetermined contour direction and corresponding contour direction code.
Figure 10:
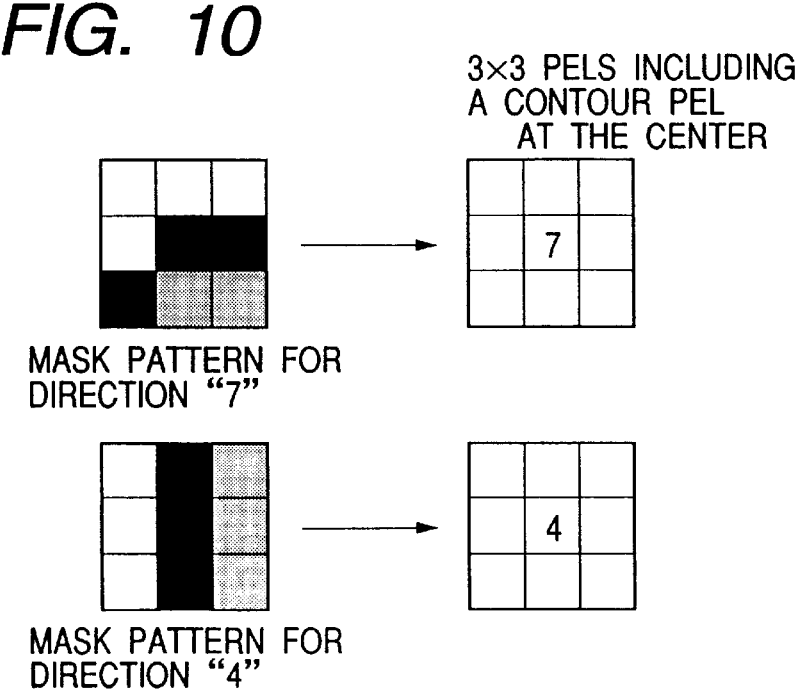
FIG. 10 is a diagram showing a way of deciding a contour direction code of a contour pel by using a mask pattern.

The contour direction calculator 22 finds a direction for each of the contour pels. For this purpose, predetermined contour directions are assigned respective contour direction codes (0, 1, . . . , 7 in this example) as shown in FIG. 9. A 3-by-3-pel-mask pattern is prepared for each direction as shown in FIG. 10. One of the mask patterns is placed on the character pattern such that the center pel of the mask pattern is positioned at one of the contour pels to be tested to see the contour direction. In FIG. 10, if the black and white pels of the mask pattern coincide with the corresponding pels of the area covered with the mask pattern in the character pattern 906, then the center pel (contour pel) of the area is assigned the direction code of the mask pattern. In this case, the pels shown as gray in the mask pattern may be either different from or the same as the corresponding pels in color. In this way, each contour pels are assigned respective contour direction codes $CDC_p$, where p is a contour number attached to each contour pel and p=1, 2, . . . , P. It is assumed that the number of contour pels is P. The contour direction calculator 22 stores the calculated contour direction codes $CDC_p$ (p=1, 2, . . . , P) in RAM 93. It is noted that the number of predetermined directions and the size of the mask patterns may be set any suitable values.

Figure 11:
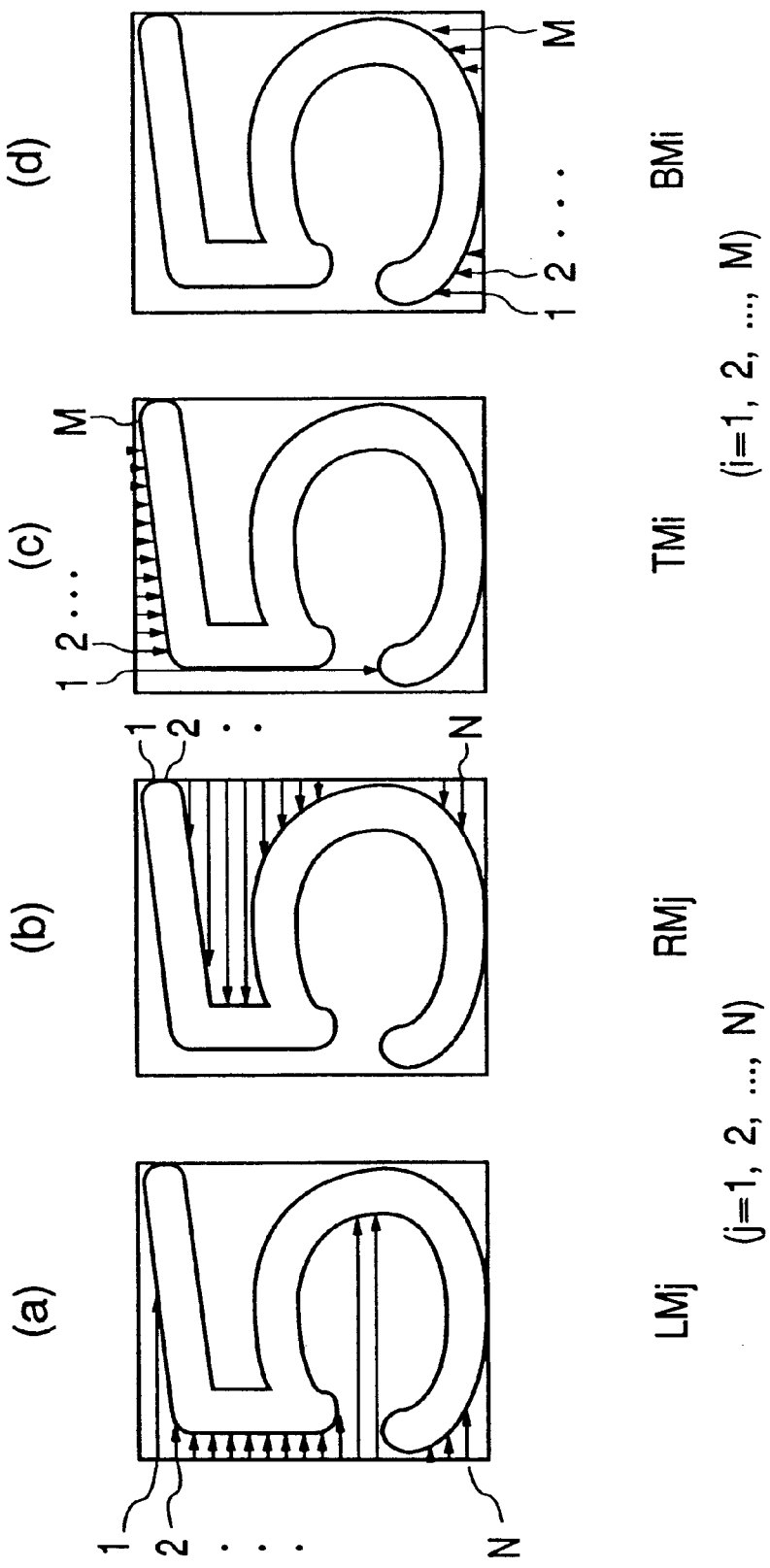
FIG. 11 is a diagram showing a way of finding a ground pel count for each line by scanning from each side to the opposite side of the bounding box.

FIG. 11 is a diagram showing a way of finding a ground pel count for each line by scanning from each side to the opposite side of the bounding box. In FIG. 11, the margin calculator 23 counts; (a) background pels on each of the horizontal pel lines from the left side to the first contour pel for left margins LMj (j=1, 2, . . . , N); (b) background pels on each of the horizontal pel lines from the right side to the first contour pel for right margins RMj; (c) background pels on each of the vertical pel lines from the top side to the first contour pel for top margins TMi (i=1, 2, . . . , M); and (d) background pels on each of the vertical pel lines from the bottom side to the first contour pel for bottom margins BMi.

Throughout this specification, it is assumed that the size, in pel, of the bounding box is M pels in width and N pels in height.

Figure 12:
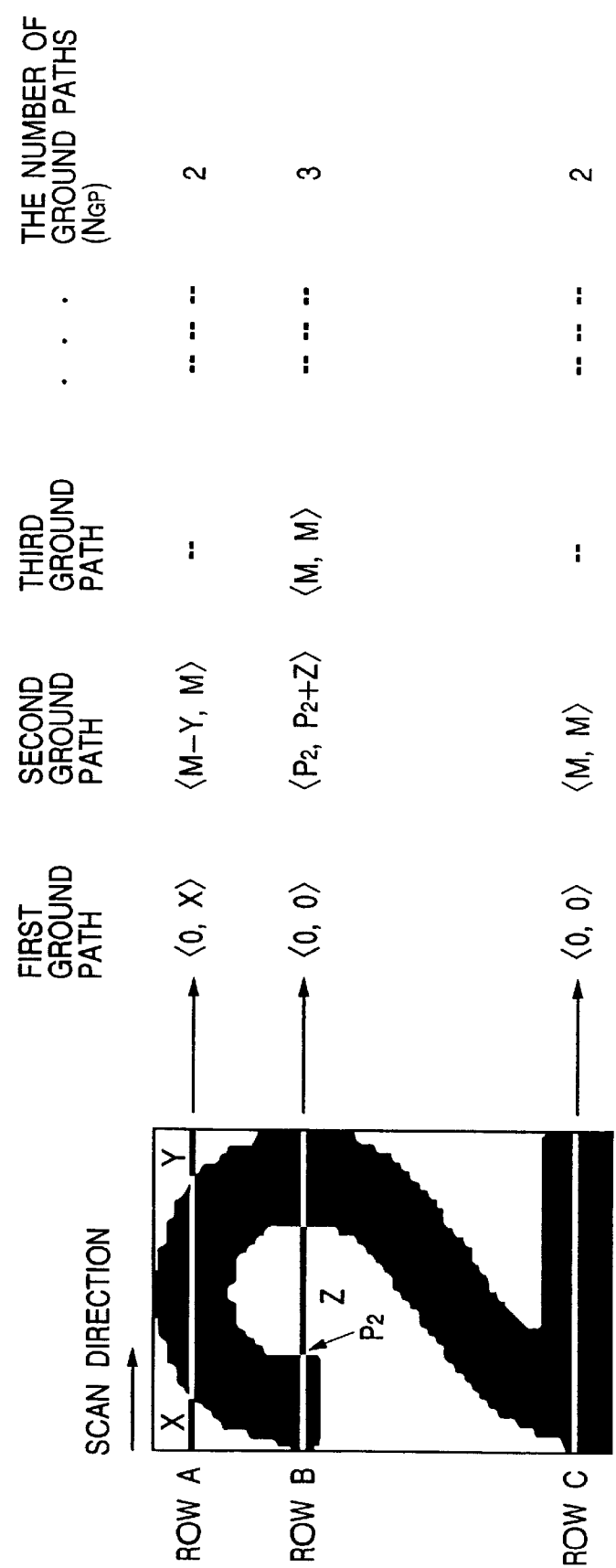
FIG. 12 is a diagram showing an exemplary way of the ground path collector 24 collecting contiguous ground (or white) pel lengths or ground paths scanning each pel row from the left side to the right side.

FIG. 12 shows an exemplary way of the ground path collector 24 collecting contiguous ground (or white) pel lengths or ground paths scanning each pel row from the left side to the right side. In FIG. 12, if the ground path collector 24 scans a row "A" from left to right, then the collector 24 traverses two ground paths labeled "X" and "Y" to store the first pel number and the last pel number of each ground path and the number of the found ground paths in RAM 93, i.e., store, in RAM 93, <0, X>, <M−Y, M> and 2 as the first and second ground paths and the ground path count ($GPC_{Lj}$, where j is a row number. j=A in this specific example). If a contour pel contacts with the bounding box, it is assumed that there is a ground path with a length of zero. For this assumption, a scanning of row "B" obtains three ground paths <0, 0>, <$P_2$, $P_2$+Z> and <M, M> as the first, the second and the third ground paths, respectively. It should be noted that the collected ground paths are stored in the found order. For this reason, scanning the same pel line in the opposite directions yields two different results. Scanning row "A" from right to left yields <M, M−Y> and <X, 0> as the first and the second ground paths. Therefore, the ground path collector 24 also collects ground paths by scanning each of the pel rows 1 through N from right to left and by scanning each of the pel columns 1 through M from top to bottom and from bottom to top.

Assuming that the largest ground path count of the ground path counts $GPC_{Lj}$ when counted from, e.g., the left side is written as $LGPC_L$, then the complex degree (CMD) of the character pattern is given by the sum of the largest ground paths for the four sides (left, right, top and bottom). That is;

$$CMD = LGPC_L + LGPC_R + LGPC_T + LGPC_B.$$

The complex degree CMD is used by the reject decision portion 50 as detailed later.

It is noted that noises may be eliminated by counting a ground pel sequence a ground path only if the ground pel sequence is not shorter than a predetermined pel length.

Figure 13:
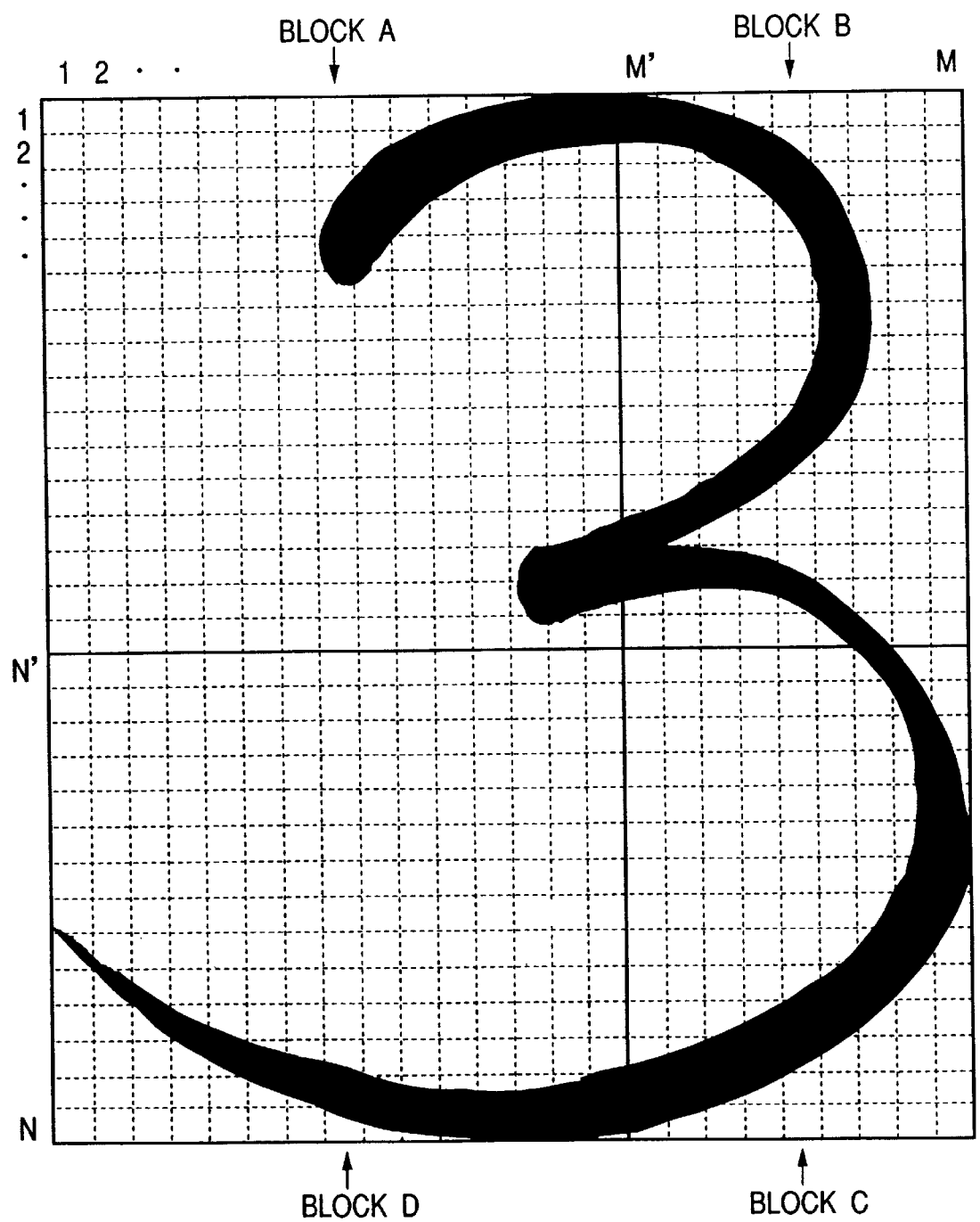
FIG. 13 is a diagram showing an exemplary operation of the bounding box X-divider 31 and Y-divider 32.

In STATISTICAL FEATURE EXTRACTOR 30 of FIG. 4, the bounding box X-divider 31 and Y-divider 32 first operate as shown in FIG. 13. The X-divider 31 divides the character pattern 906 into upper and lower two areas such that the two areas have the same number of black pels. As a result, the X-divider 31 outputs the pel row number (N' in FIG. 13) of the first row of the lower area (0<N'<N). In the same way, the bounding box Y-divider 32 divides the character pattern 906 into a left area (comprising blocks A and D) and a right area (comprising blocks B and C) that have the same number of black pels to provide the pel column number (M' in FIG. 13) of the first column of the right area (0<M'<M). It is noted that the bounding box may be divided in any other suitable method than just-described equal black pel count dividing. The outputs of the X-divider 31 and the Y-divider 32 are used by the pel-count-by-CD (contour direction)-calculator 33 and the calculators 35 and 37. However, different dividing methods may be used for the calculator 33 and a group of calculators 35 and 37.

Figure 14:
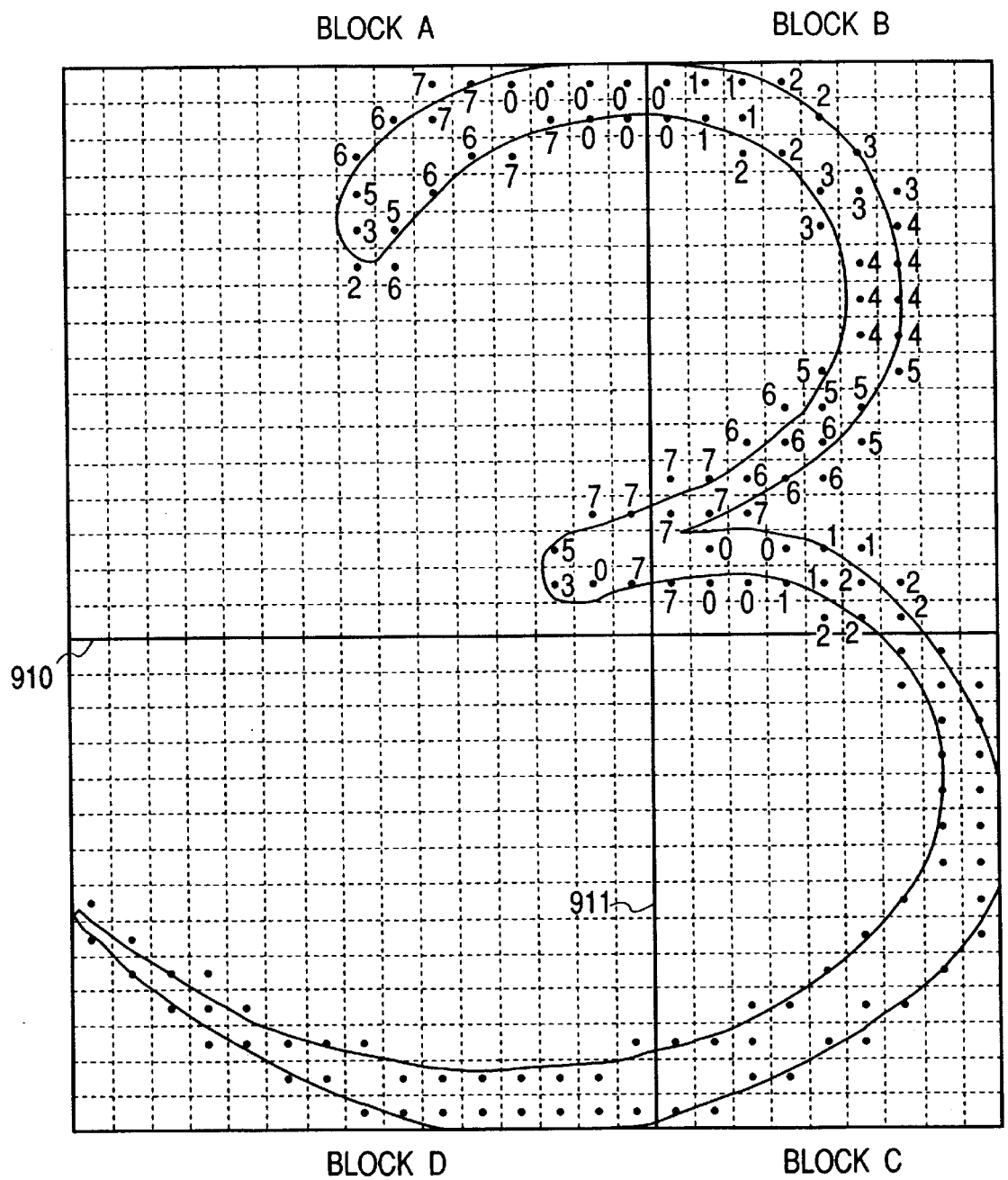
FIG. 14 is a diagram showing an exemplary contour image for use in the description of operation of the pel-count-by-CD(contour direction)-calculator 33.
Figures 15, 16:
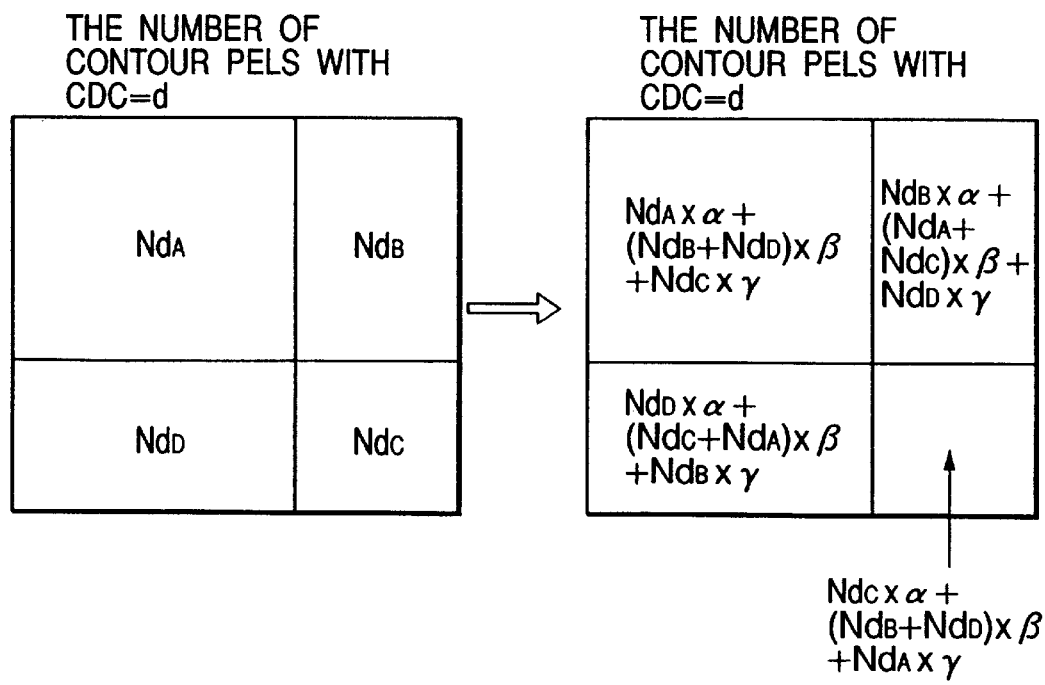
FIG. 15 is a diagram showing an exemplary operation of the pel-count-by-CD calculator 33.
FIG. 16 is a diagram showing an exemplary way of calculating weighted sums for the calculated pel counts $Nd_A$, $Nd_B$, $Nd_C$ and $Nd_D$ for each CDC value "d"

FIG. 14 is a diagram showing an exemplary contour image for use in the description of operation of the pel-count-by-CD(contour direction)-calculator 33. In FIG. 14, the small squares are the white and black pels of the contour image. The small squares each having a dot therein are the contour pels (i.e., the pels that constitute the contour). The digit attached to each of the contour pels in the upper blocks A and B is the above-described direction code indicative of the direction of the contour pel. The horizontal (910) and the vertical (911) thick lines are borderlines determined by the bounding box X-divider 31 and the Y-divider 32, respectively. FIG. 15 shows an exemplary operation of the pel-count-by-CD calculator 33. In FIG. 15, the calculator 33 first counts, for each block, the contour pels that have a contour direction code (CDC) of 0 to provide four pel counts $N0_A$, $N0_B$, $N0_C$ and $N0_D$. In the same way, the calculator 33 finds pel counts for the other CDCs. Thus, the calculator 33 finally provides the pel counts $Nd_A$, $Nd_B$, $Nd_C$ and $Nd_D$ (d=0, 1, . . . , 7). For example, the pel counts $Nd_A$ (d=0, 1, . . . , 7) are 7, 0, 1, 2, 0, 3, 5 and 8.

The normalizer 34 normalizes each of the pel counts from the pel-count-by-CD calculator 33 by dividing each pel count by a size of the count target block. The normalizer 34 stores the normalized pel counts in RAM 93 as the contour direction statistic 934. As the size of the count target block, the area of the block defined by the width and the height thereof or a longer one of the width and the height thereof may be used.

Alternatively, for the calculated pel counts $Nd_A$, $Nd_B$, $Nd_C$ and $Nd_D$ for each CDC value "d", it is possible to calculate corresponding weighted sums prior to the normalization as shown in FIG. 16. The weighted sums corresponding to the pel counts $Nd_A$, $Nd_B$, $Nd_C$ and $Nd_D$ may be given by:

$$Nd_A \times \alpha + (Nd_B + Nd_D) \times \beta + Nd_C \times \gamma;$$

$$Nd_B \times \alpha + (Nd_A + Nd_C) \times \beta + Nd_D \times \gamma;$$

$$Nd_C \times \alpha + (Nd_B + Nd_D) \times \beta + Nd_A \times \gamma;$$

and $$Nd_D \times \alpha + (Nd_C + Nd_A) \times \beta + Nd_B \times \gamma,$$

where $0 \leq \gamma < \beta < \alpha$.

Figure 17:
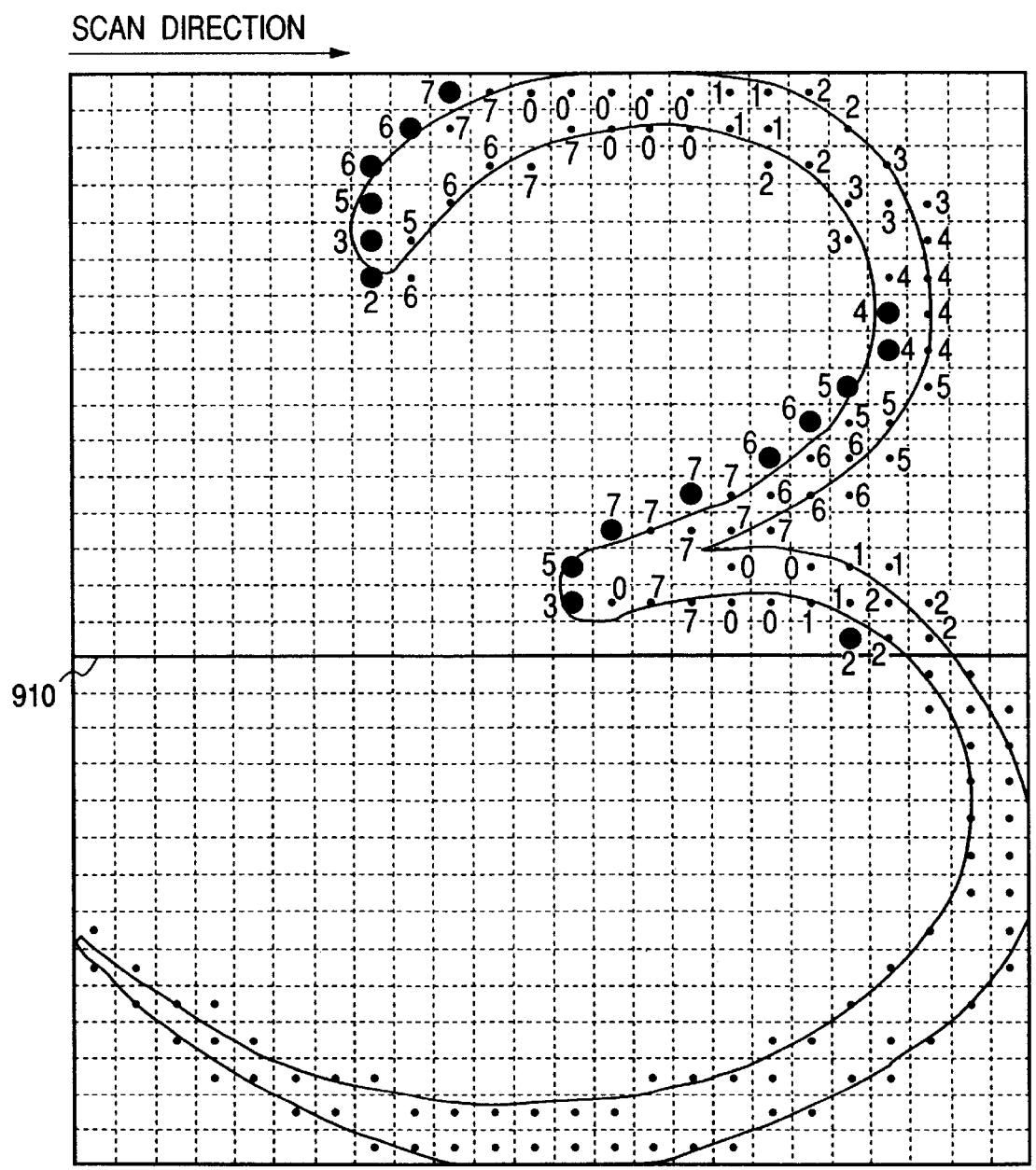
FIG. 17 is a diagram showing, by small squares having a black circle inside, the contour pels to be counted when the pel rows of the upper block is scanned from left to right.
Figure 18:
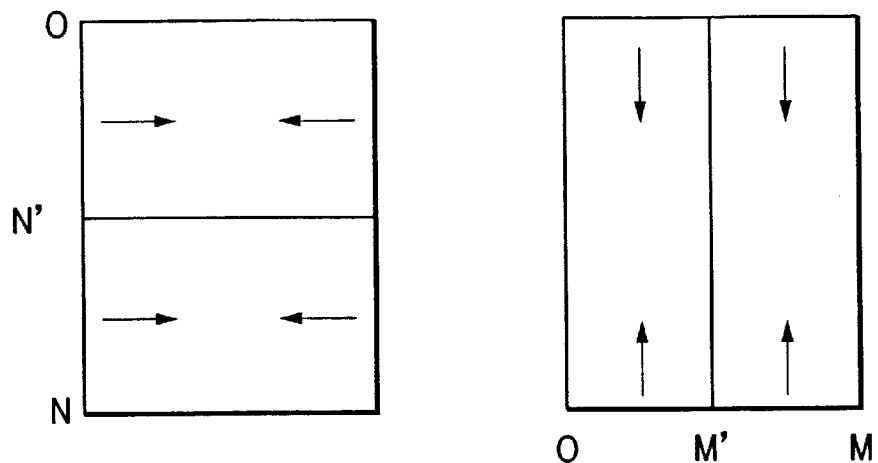
FIG. 18 is a diagram showing the directions of scanning by the outer-pel-count-by-CD calculator 35 and the margin sum calculator 37.

FIG. 17 is a diagram showing the contour pels to be counted when the outer-pel-count-by-CD calculator 35 scans the pel rows of the upper block from left to right. The pels to be counted is shown by small squares having a black circle inside. In FIG. 17, the calculator 35 scans each of the rows in the upper block from left to right to find the first contour pel, to obtain the CDC value from the output of the contour direction calculator 22 and to increment the value of the counter associated with the obtained CDC value. Assuming that all of the counter values $Nd_{U \rightarrow}$ (d=0, 1, . . . , 7) are set to zero before the scanning of the rows in the upper block from left to right, the counter values $Nd_{U \rightarrow}$ (d=0, 1, . . . , 7) after the scanning indicates the number of contour pels whose CDC value is "d". The subscript "u" indicates the upper block, and an arrow "→" indicates the scan direction. The outer-pel-count-by-CD calculator 35 scans the upper block and the lower block along the border line 910 in the two opposing directions "→" and "←" to provide the pel counts $Nd_{U \rightarrow}$, $Nd_{U \leftarrow}$, $Nd_{W \rightarrow}$, and $Nd_{W \leftarrow}$, and further scans the left block and the right lock along the border line 911 in the two opposing directions "↓" and "↑" to provide the pel counts $Nd_{L \downarrow}$, $Nd_{L \uparrow}$, $Nd_{R \downarrow}$, and $Nd_{R \uparrow}$ as shown in FIG. 18. The subscript "w" indicates the lower block, and arrows "←", "↓" and "↑" indicate the scan directions.

The normalizer 36 normalizes each of the pel counts $Nd_{U \rightarrow}$, $Nd_{U \leftarrow}$, $Nd_{W \rightarrow}$, $Nd_{W \leftarrow}$, $Nd_{L \downarrow}$, $Nd_{L \uparrow}$, $Nd_{R \downarrow}$, and $Nd_{R \uparrow}$ from the outer-pel-count-by-CD calculator 35 by dividing each pel count by a size of the count target block. The normalizer 36 stores the normalized pel counts in RAM 93 as the outer contour direction statistic 936. As the size of the count target block, the area of the block defined by the width and the height thereof or a longer one of the width and the height thereof may be used.

By using the margin data output from the margin calculator 23, the margin sum calculator 37 calculates a sum of the left margins for each of the upper block and the lower block to provide upper and lower left margin sums $LMS_U$ and $LMS_W$; calculates a sum of the right margins for each of the upper block and the lower block to provide upper and lower right margin sums $RMS_U$ and $RMS_W$; calculates a sum of the top margins for each of the left block and the right block to provide left and right top margin sums $TMS_L$ and $TMS_R$; and calculates a sum of the bottom margins for each of the left block and the right block to provide left and right bottom margin sums $BMS_L$ and $BMS_R$.

The normalizer 38 normalizes each of the margin sums $LMS_U$, $LMS_W$, $RMS_U$, $RMS_W$, $TMS_L$, $TMS_R$, $BMS_L$ and $BMS_R$ from the margin sum calculator 37 by dividing each margin sum by a size of the count target block. The normalizer 38 stores the normalized margin sums in RAM 93 as the margin statistic 938. As the size of the count target block, the area of the block defined by the width and the height thereof or a longer one of the width and the height thereof may be used.

Figure 19:
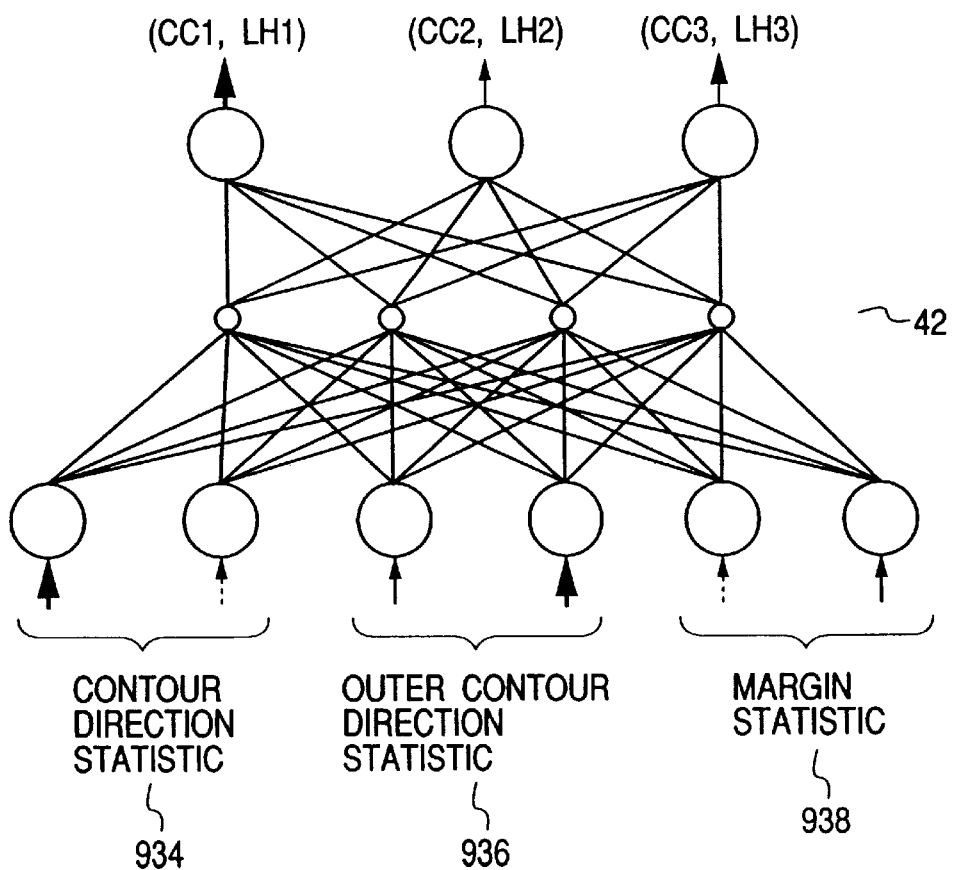
FIG. 19 is a diagram conceptually showing a hierarchical neural network constituting the statistical feature-based recognizer 40.

STATISTICAL FEATURE-BASED RECOGNIZER 40 finds a category into which the character pattern is classified on the basis of the contour direction statistic 934, the outer contour direction statistic 936 and the margin statistic 938 calculated by the statistical feature extractor 30. FIG. 19 shows a way of finding at least one character candidate (CC1~CC3) (which constitutes a category) by using a trained neural network 42. LH1~LH3 indicates the magnitude of the likelihood of the character candidates CC1~CC3 output from the final layer neurons. In FIG. 19, entering the contour direction statistic 934, the outer contour direction statistic 936 and the margin statistic 938 in the first layer of the neural network 42 causes signals to run through the middle layer to the final layer, resulting in final layer neurons generating output signals corresponding to the degrees of similarity for character candidates. The statistical feature-based recognizer 40 finally outputs a predetermined number (2 in this example) of character candidates in order of the magnitude of the likelihood. It is assumed that the size of the arrows of the final layer neurons indicate the magnitude of the likelihood the neurons output. Then, since the likelihood LH1 and LH3 are the maximum one and the second maximum one, the statistical feature-based recognizer 40 outputs tuples (CC1, LH1) and (CC3, LH3) in the this order in the specific example shown in FIG. 19. It is noted that a well-known scale, i.e., the degree of similarity (DOS) may be used as the likelihood. The maximum degree of similarity and the second maximum degree of similarity given by the statistical feature-based recognizer 40 are hereinafter denoted as DOSm and DOSs, respectively.

It should be noted that the statistical feature-based recognizer 40 may be realized by using any neural network other than that of FIG. 19 or any other configuration.

REJECT DECISION PORTION 50 rejects the output data from the statistical feature-based recognizer 40 in any of the following cases:

- the ratio of the second maximum degree of similarity (DOSs) to the maximum degree of similarity (DOSm) is larger than a predetermined threshold value THa (i.e., THa<DOSs/DOSm);
- the maximum degree of similarity DOSm is smaller than a predetermined threshold value THb (i.e., DOSm<THb); and
- the complex degree CMD is larger than a predetermined threshold value THc (i.e., THc<CMD), where CMD is the sum of the largest ground path counts for the four sides, i.e., $CMD = LGPC_L + LGPC_R + LGPC_T + LGPC_B$.

In other cases, reject decision portion 50 outputs or passes the output data from the statistical feature-based recognizer 40 as they are to the structural feature-based recognizer 70.

Figure 20:
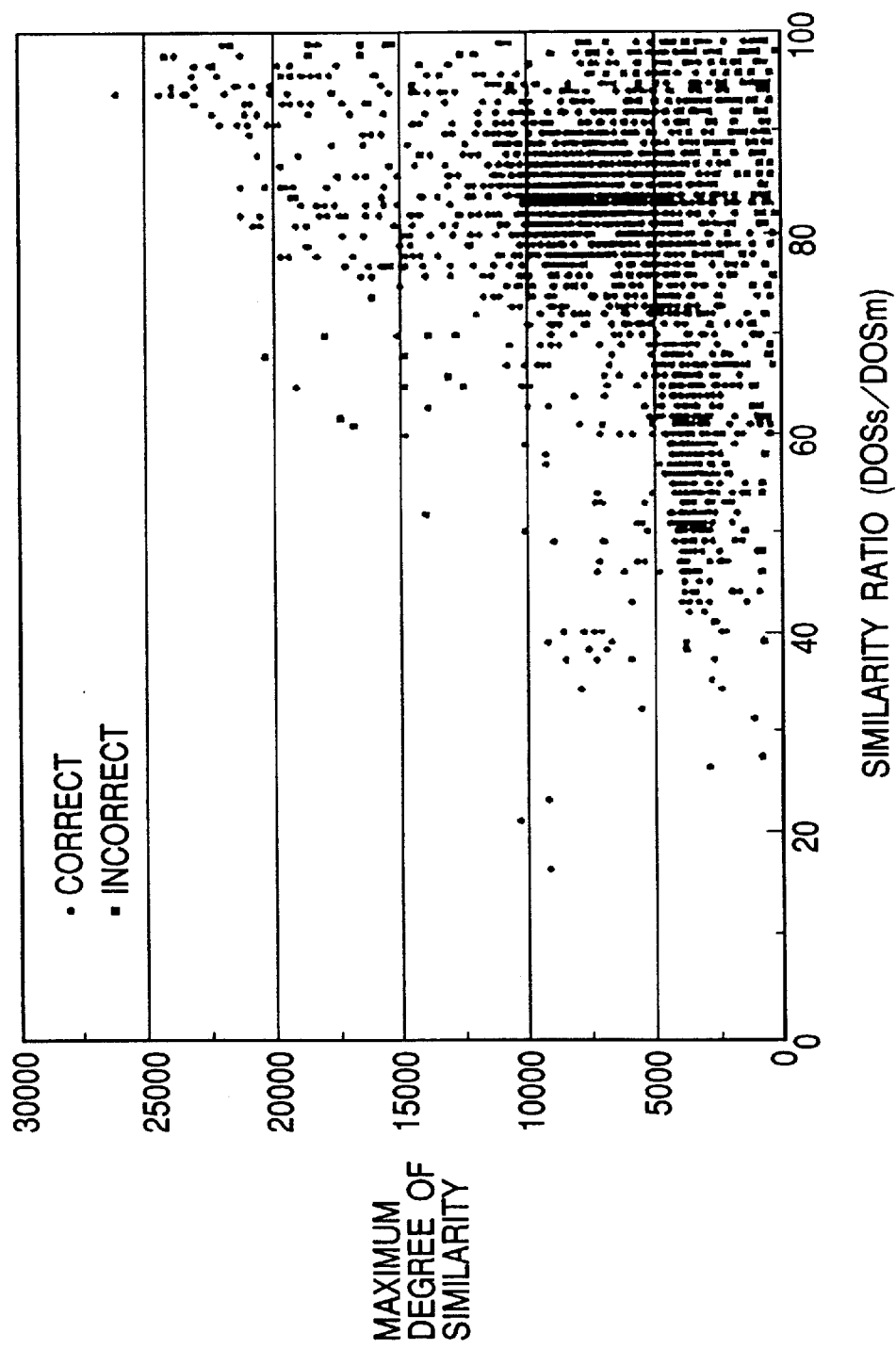
FIG. 20 is a diagram showing a graph which makes the similarity ratio (DOSs/DOSm) and the maximum similarity DOSm the X and Y coordinates and has correct results (or characters) and incorrect results (or characters) plotted thereon.
Figure 21:
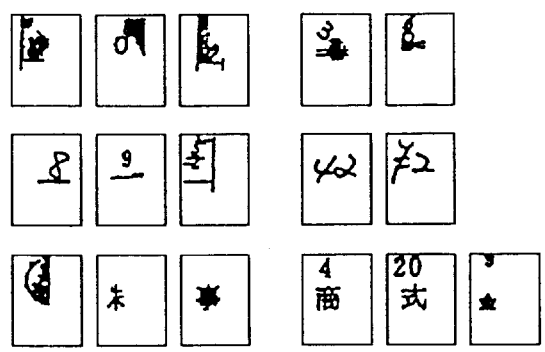
FIG. 21 shows some examples of the characters whose maximum degrees of similarity are smaller than 500.

FIG. 20 is a diagram showing a graph which makes the similarity ratio (DOSs/DOSm) and the maximum similarity DOSm the X and Y coordinates and has correct results (or characters) and incorrect results (or characters) plotted thereon. The predetermined threshold values THa and THb are determined experimentally from this graph. In FIG. 20, only incorrect characters are distributed in a area where the maximum similarity is relatively small, regardless of the similarity ratio. For example, from the examination of character patterns whose maximum degrees of similarity are smaller than 500, (147 characters), it was found that errors occurred to most (144 characters) of the examined characters in a preprocessing stage. FIG. 21 shows some examples of the characters whose maximum degrees of similarity are smaller than 500. It is seen from FIG. 21 that including the comparison of the maximum similarity with the threshold THb in the criterion of reject enables the rejection of character patterns to which errors have occurred in preprocesses such as noise elimination, ruled line separation, extraction of corrected money amount, separation of chained character patterns, elimination of character patterns not to be recognized.

In the above description, the complex degree CMD is calculated as the sum of the largest ground paths for the four sides. However, the complex degree CMD may be any value concerning the ground paths, e.g., the sum of the ground path counts larger than a predetermined numeral calculated for the four sides of the bounding box.

Turning now to FIG. 5, STRUCTURAL FEATURE EXTRACTOR 60 is described in the following.

The local margin extractor 61 extracts a local feature based on the margin so as to enable the structural feature based recognizer 70 to separate similar categories. In order to detect a projection of the margin along one side, say, the left side, the local margin extractor 61 makes a test for each pel row to see if the ratio of the left margin $LM_j$ (j=1, 2, ..., N) to the width (M) of the bounding box, i.e., $LM_j/M$, exceeds a first threshold. If the number of consecutive rows that passed the tests exceeds a second threshold, the local margin extractor 61 judges that the left margin is projecting in the consecutive rows. The structural feature of the left margin having a projection in the middle thereof is useful for the separation of a character "3" (see (a) of FIG. 22) because similar characters "0", "6", "8" and "9" have no such structural feature. As shown by (b) and (c) of FIG. 22, an upper part projection of the left margin and a lower part projection of the left margin are used for the separation of characters "6" and "9", respectively. It is noted that the parts of margins to be tested in real recognition may be determined on the basis of the analysis of errors in the statistical feature-based recognizer 40 such that the errors in the recognizer 40 decrease in number. Also, the local margin extractor 61 judges the linearity (or the curvature) of the outer contour from the variation of margins of the consecutive rows or columns. For example, in a pattern for "5" shown by (d) of FIG. 22, the top margin changes substantially at a constant rate, the upper contour is judged to be straight. In a pattern for "6" shown by (e) of FIG. 22, the top margin changes largely, causing the upper contour to be judged to be curved. It is preferable to prepare a database for storing structural features to be examined and corresponding list of recognizable characters by the structural features. A common database or different dedicated databases may be prepared for printed characters and handwritten characters.

Figure 23:
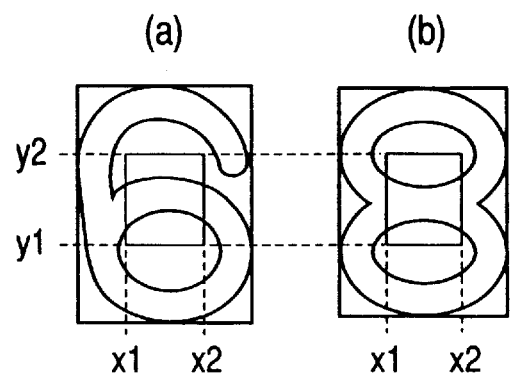
FIG. 23 is a diagram showing exemplary ways of separating characters '6' and '8' by making a test to see if a stroke is convex upward or down ward.

The local feature extractor 62 extracts a local feature by examining a distribution of contour direction codes (CDCs) while tracking a local contour. Characters "6" and "8" are separated by judging whether the contours of the central pert of the character pattern is convex upward or downward as shown in FIG. 23. Specifically, if two contours for $x1 \leq i \leq x2$ and $y1 \leq i \leq y2$ are convex upward in a character pattern, then the character pattern is for a character "6". Similarly, if the upper and lower contour segments for $x1 \leq i \leq x2$ and $y1 \leq i \leq y2$ are convex downward and upward, respectively, then the character pattern is for a character "8".

In one embodiment, a contour segment is judged as convex upward if CDC values of 5~7 are prevailing in a left part of the contour segment, CDC values of 0, 1 and 7 are prevailing in a central part, and 1, 2 and 3 are prevailing in a right part of the contour segment. A contour segment is judged as convex downward if CDC values of 1~3 are prevailing in a left part of the contour segment, CDC values of 0, 1 and 7 are prevailing in a central part, and 5~7 are prevailing in a right part of the contour segment.

The loop extractor 63 extracts a loop in a character pattern. Specifically, the loop extractor 63 first tracks a contour on and on, and judges the contour to be a loop if the loop extractor 63 finally returns to the initial point. If white pels exist in the identified contour loop, then the loop extractor 63 provides information indicative of the existence of a loop by a stroke. FIG. 24A and B are diagrams showing exemplary character patterns that contains a stroke loop and that does not contain a loop, respectively. In FIG. 24, a digit in a small square is a contour direction code of the square, the pels with a symbol "+" are black pels, and the pels with a symbol "−" are white pels. In FIG. 24A, the gray square with a symbol "−" are extracted as a loop by a stroke. It is determined that there is no loop in FIG. 24B because the contour loop does not contain black pels (or symbols "−") inside. It is noted that noise may be eliminated by providing a rule that a contour loop is judged to be a stroke only if the contour loop contains a certain number of white pels.

FIG. 25 is a diagram showing an arrangement of the end point & intersecting point extractor 64. In FIG. 25, the end point and intersecting point extractor 64 comprises a candidate extractor 642 and a candidate verifier 644. The candidate extractor 642 extracts an appearing point (FIG. 26(*a*)) and a disappearing point (FIG. 26(*b*)) as end points, and extracts a confluence (FIG. 26(*c*)) and a diverging point (FIG. 26(*d*)) as intersecting points. The candidate verifier 644 obtains qualified end and intersecting points by eliminating inappropriate candidates for end and intersecting points according to geometric relations between the candidates. The candidates for end and intersecting points are extracted according to the following rules. If at least one black pel exists in the following line of a line in which white pels are distributed near said at least one black pel as shown in FIG. 26(a), then it is counted as an appearance. If an area of black pels in a line changes to white pels in the following line as shown in FIG. 26(b), then it is counted as a disappearance. Also, if two areas of consecutive black pels in a first line meet each other in the line following the first line as shown in FIG. 26(c), then it is counted as a confluence. If a single area of consecutive black pels in a first line breaks into two in the line following the first line as shown in FIG. 26(d), then it is counted as a divergence. The points classified into the above-described "confluence", "divergence", "appearance" and "disappearance" for each of the horizontal and vertical scanning directions are output as intersecting points and end points.

Figure 27:
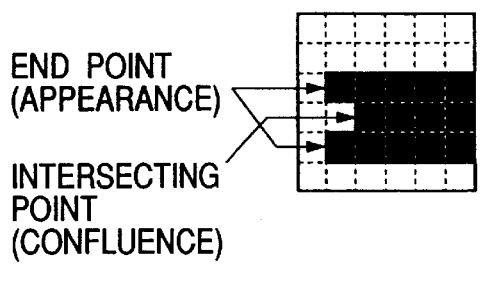
FIGS. 27 and 28 are diagrams showing exemplary character patterns that contain inappropriate end points and intersecting points to be eliminated by the candidate verifier 644.
Figure 28:
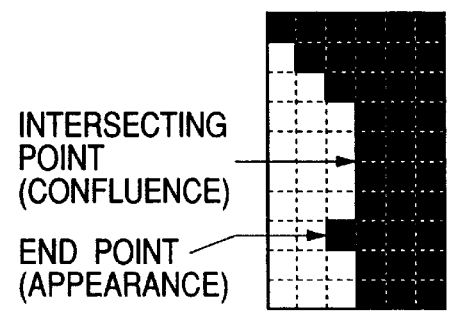

The candidate verifier 644 examines relative positions between candidates obtained by scanning of an identical direction. If the distance between end point candidates and the distance between an endpoint candidate and an intersecting point candidate are short, then the candidate verifier 644 eliminates the endpoint candidates and the intersecting point candidate. For example, in a large character pattern (e.g., the width by the height is more than 50 pels), if the distance between two end point candidates of the same kind (i.e., appearance and appearance, or disappearance and disappearance) is vary short and if, between the two end point candidates, there is an intersection point candidate (it is of a confluence if the end points are of an appearance and of a divergence if the end points are of a disappearance) as shown in FIG. 27, or if an intersecting point candidate exists near and at the next line of an end point candidate and if, between the two point candidates, there is not an end point of a different kind (i.e., a disappearance if the end point candidate is of an appearance and an appearance if the end point candidate is of a disappearance) as shown in FIG. 28, then the candidate verifier 644 eliminates the end point and the intersecting point and judges the remaining end point candidates and intersecting points to be end points and intersecting points.

Figure 29:
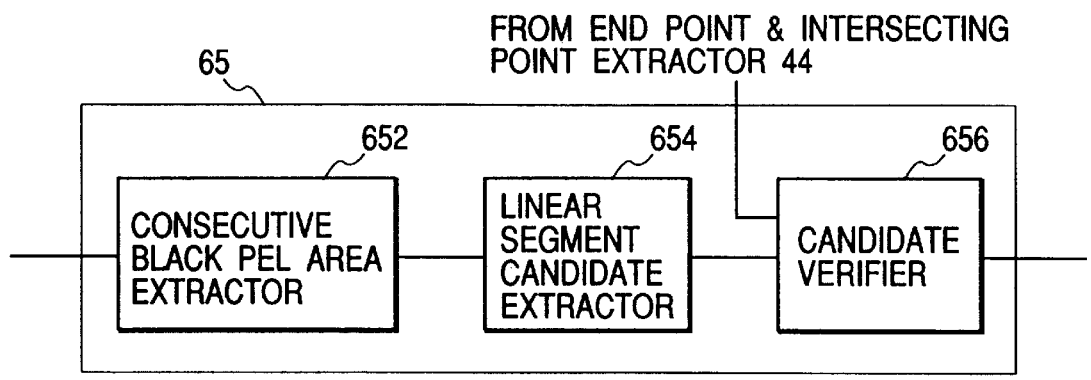
FIG. 29 is a block diagram showing an arrangement of the linear segment extractor 65.

FIG. 29 is a block diagram showing an arrangement of the linear segment extractor 65. In FIG. 29, the linear segment extractor 65 comprises a consecutive black pel area extractor 652, a linear segment candidate extractor 654 and a candidate verifier 656.

On the basis of the output of the path length calculator 24, the consecutive black pel area extractor 652 makes a test to see if there are any consecutive black pel lines that exceed a predetermined threshold value. If such a line is found, the extractor 652 stores the coordinates of the end points of the found line. Assuming the predetermined threshold value to be 10 pels, the extractor 652 extracts lines 2 through 4 in an image of FIG. 30.

Figure 30:
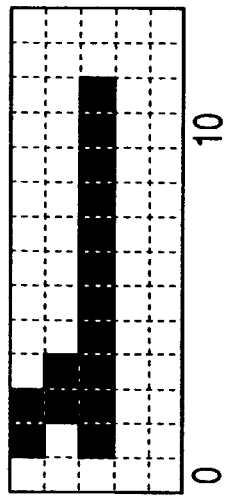
FIG. 30 is a diagram showing an exemplary partial image that is judged as a straight segment.
Figure 31:
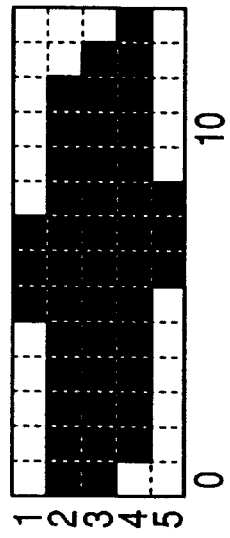
FIG. 31 is a diagram showing an exemplary partial image that is not judged as a straight segment.

The linear segment candidate extractor 654 examines each of the areas comprising extracted adjacent lines to see if the area contains more lines than a predetermined line count. If so, the extractor 654 judges the area to be a linear or strait segment. If the predetermined threshold value is 10 (pels) and the predetermined line count is 3 (lines), then the area comprising lines 2 through 4 of FIG. 30 is judged to be a straight segment, but the image of FIG. 31 is not judged as a straight segment on the basis of geometrical relations of end and intersecting points output from the end point and intersecting point extractor 44 in the candidate verifier 656. Taking the thickness of handwritten lines into account by using a line count threshold makes it possible to eliminate the effect of ruled lines, noises and so on as shown in FIG. 31.

Figure 32:
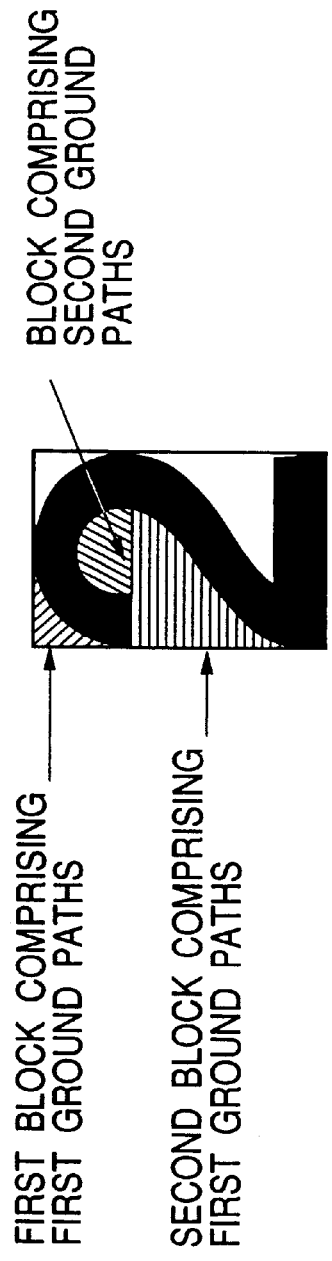
FIG. 32 is a diagram showing an exemplary way of the ground block extractor 66 extracting blocks in a series of left-to-right scans from top row to the bottom.

The ground block extractor 66 extracts a ground block by combining adjacent ground paths of the same order. FIG. 32 shows an exemplary way of the ground block extractor 66 extracting ground blocks in a series of left-to-right scans from top row to the bottom. In FIG. 32, the ground block extractor 66 extracts the first and the second ground blocks from first ground paths and one block from second ground paths (see FIG. 12). In this case, the extractor 66 stores, for each of the ground blocks, the number of pels constituting the ground block as the size of the block and the XY coordinates of upper left corner and lower right corner of the box bounding the ground box as position information of the block.

The ground label extractor 67 extracts a ground label by combining adjacent white pels. FIG. 33 shows an exemplary way of the ground label extractor 67 extracting ground labels in a series of left-to-right scans from top row to the bottom. In FIG. 33, the ground label extractor 67 extracts four ground labels while attaching a label number to each ground label. In this case, the extractor 67 stores, for each of the ground labels, the number of pels constituting the ground label, the XY coordinates of upper left corner and lower right corner of the box bounding the ground label and information indicative of whether the ground label contacts with the bounding box of the character pattern.

Referring now to FIG. 6, the operation of STRUCTURAL FEATURE-BASED RECOGNIZER 70 will be described in the following. The character type estimator 71 estimates whether a character sequence is printed or handwritten by the variation of the heights of the bounding boxes for the character sequence. Specifically, in case of a transfer slip, since the characters written in the same column are basically in the same character style, if the heights of the characters written in the same column are uniform, the characters are estimated to be printed. If the heights of the characters written in the same column vary significantly, then the characters are estimated to be handwritten.

The switch 72 is controlled by the output from the character type estimator 71. Specifically, in case of printed characters, the switch 72 is configured to select the confusing printed character database 78. In case of handwritten characters, the switch 72 selects the confusing handwritten character database 79.

The bounding box category determiner 73 examines the bounding box data 905 to see if the character pattern can be identified into a single character from the size of the bounding box. If so, and if the single character is included in or coincides with the character(s) passed from the reject decision portion 50, then the bounding box category determiner 73 outputs the single character as the output of the character recognition system 1.

The confusing category selector 74 and the structure-based final recognizer 76 use one of the above-mentioned databases 78 and 79 depending on the character type decided by the estimator 71. FIG. 34 is a diagram showing an exemplary structure of the database 78 and 79. In FIG. 34, each record of the database 78 and 79 includes an ID field 701 for containing the record ID; a confusing category field 702 which usually contains a pair of ordered characters; and a discrimination rule field 704 for containing at least one statement including relevant structural feature(s) and criterion(s). As seen from the above description, a record may contain a plurality of values in the discrimination rule field 704. The confusing category field 702 may contain only one character in either of two positions. Alternatively, a special character or code may be used in the confusing category field 702 to indicate "don't care" for the character or code.

If the bounding box category determiner 73 can not identify the character pattern into a single character from the bounding box data 905, if the statistical feature-based recognizer 40 have output more than one character (two characters in this specific example), and if the reject decision portion 50 did not reject the two characters from the recognizer 40, then the confusing category selector 74 searches the confusing category fields 702 of the connected (or selected) confusing character database 78 or 79 for the two characters to pass, to the structure-based final recognizer 76, the record ID (in ID field) of the record that contains the two characters in its confusing category field 702. If the confusing category selector 74 failed the search, the selector 74 may output a reject signal indicative of impossibility of recognition.

In response to a reception of the record ID from the confusing category selector 74, the structure-based final recognizer 76 recognizes the current character referring to the discrimination rule field 704 of the record identified by the received ID.

Some examples for printed character recognition will be described in the following.

Figure 22:
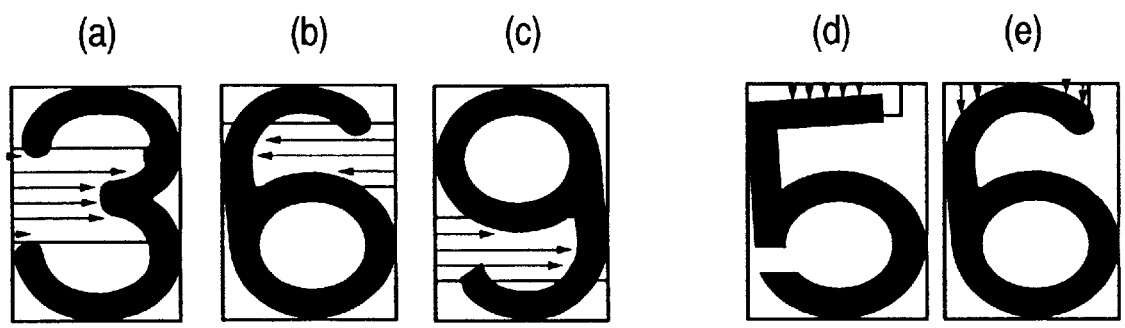
FIG. 22 is a diagram showing some exemplary way of using a local margin test for separating a specific character or category.

In order to prepare for a case when the statistical feature-based recognizer 40 have output a character "8" as the maximum-similarity character, the confusing printed character database 78 preferable have a record that contain "8/" in the confusing category field 702. (The absence of value after "/" indicates that the second-maximum-similarity character from the statistical feature-based recognizer 40 is not cared.) Because a character "6" is tend to be judged as "8" in a statistical feature-based recognition system. In this case, the discrimination rule field 704 includes statements concerning local structural features of FIG. 21 and a stroke loop of FIG. 24. Also, in case of a record for a confusing character pair "3" and "6", the discrimination rule field 704 includes statements concerning margin projections as shown in FIG. 22.

More specifically, the discrimination rule field 704 of the record for character "8" contains the following rules:

(2) Use loop features:
   If there is no loop, then "3".
   If there is one loop above the center, then "9".
   If there is one loop below the center, then "6".
   If there are two loops, then "8"

(3) Use local stroke features in the central part
   If both upper and lower strokes are convex upward, then "6".
   If upper and lower strokes are convex downward and upward, respectively, then "3" or "8".
   If both upper and lower strokes are convex downward, then "9".

As seen from just described rules, rules that uses different structural features may sometimes provide conflicting results (or different characters). In such a case, the structural feature-based recognizer 70 outputs the maximum-similarity character decided by the statistical feature-based recognizer 40.

Some examples for handwritten character recognition will be described in the following.

Since a handwritten character "3" tends to be recognized as "8" in a statistical feature-based recognition system, the handwritten printed character database 79 preferably has a record whose confusing category field 702 contains "8/3". In this case, features extracted by the ground block extractor 66 and the loop extractor 63 is used for recognition.

Also, handwritten characters "2" and "3" as shown in FIG. 35 are often confused. In this case, the recognition is achieved based on the number and the positions of end points (appearance) in the horizontal direction. Specifically, if there are two appearing end points with one in the upper area and the other in the lower area, then "2" is selected. If there are three appearing end points in upper, middle and lower areas, respectively, then "3" is selected.

Figures 36A, 36B, 36C:
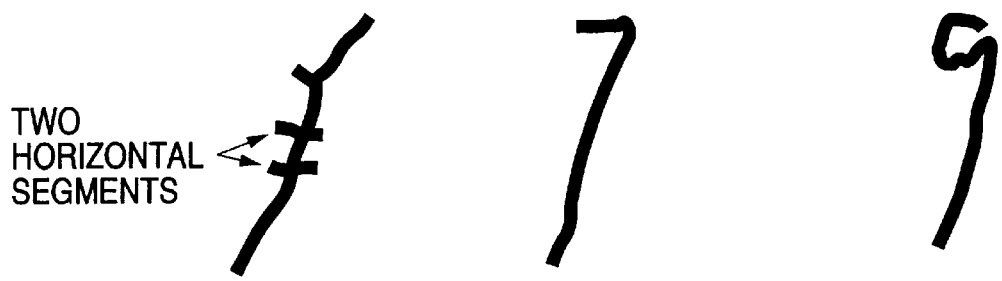

Also, character "Y" is sometimes recognized as "7" and "9" (see FIG. 36). In this case, detecting two horizontal segments near the middle of the character pattern enables a discrimination between "Y" and a category "7" and "9".

Figure 37:
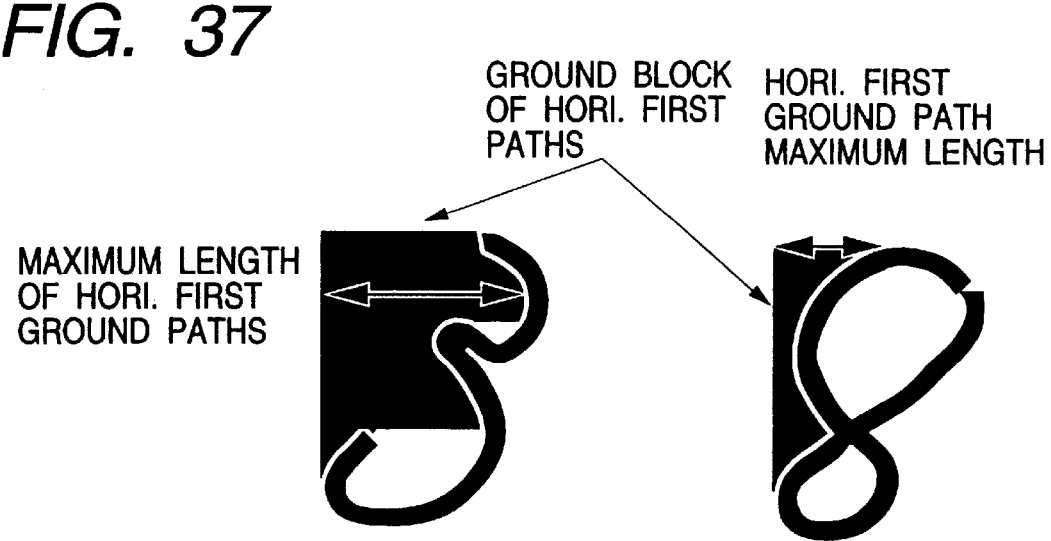

FIG. 37 shows examples of handwritten characters "8" and "3". If the largest-similarity character and the second largest-similarity character are "8" and "3", the structural feature-based recognizer 70 recognizes the character pattern according to the following rules obtained from the discrimination rule field 704 associated with characters "8" and "3".

The character pattern is finally recognized as "3" if the following conditions are all met:

(1) the number of loops are zero or one;
   (2) (the area of horizontal first ground path block/the area of bounding box)>threshold 1; and
   (3) (the maximum length of the horizontal first ground paths/the bounding box width)>threshold 2.

Otherwise, the largest similarity character "8" is finally used.

Figure 38:
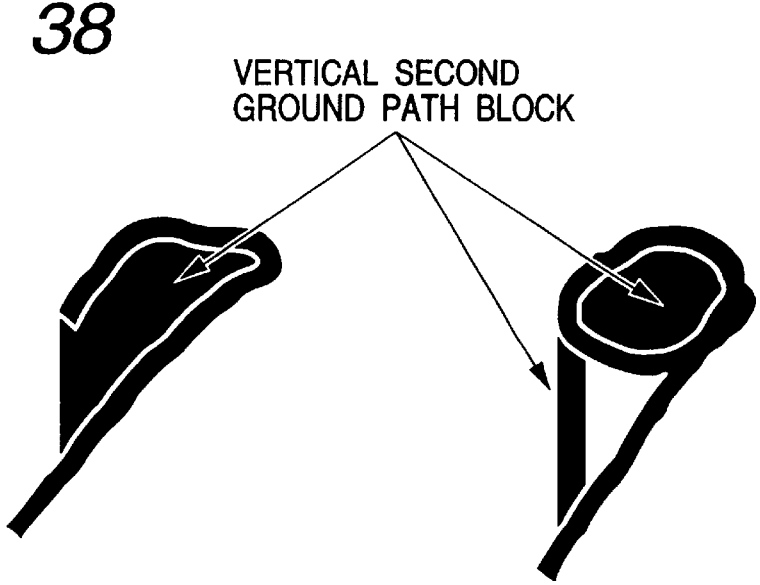

If the largest-similarity character and the second largest-similarity character are "9" and "7" as in case of FIG. 38, the character pattern is finally recognized as "7" if the following conditions are all met:

(1) there is no loop; and
   (2) the number of the vertical second ground path blocks is one.

Embodiment II

Figure 39:
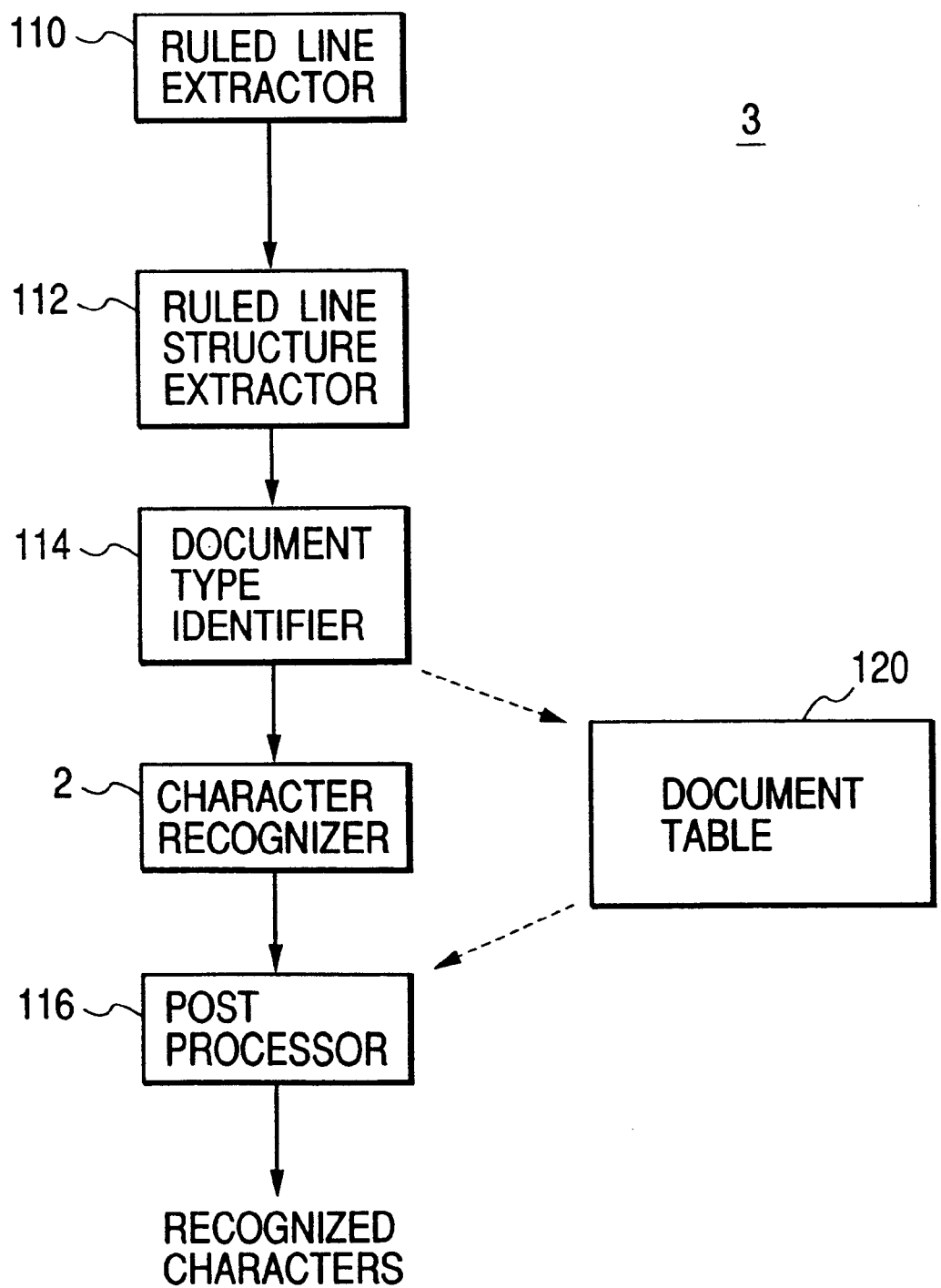
FIG. 39 is a schematic block diagram showing an arrangement of a character recognition system 3 which recognizes characters printed or handwritten on an entry form with ruled lines in accordance with a second illustrative embodiment of the invention.

FIG. 39 is a schematic block diagram showing an arrangement of a character recognition system 3 which recognizes characters printed or handwritten on an entry form with ruled lines in accordance with a second illustrative embodiment of the invention. The hardware of the character recognition system 3 may be identical to that of the device 1 shown in FIG. 1. The arrangement of the character recognition system 3 of FIG. 39 is identical to that of FIG. 2 except that a ruled line extractor 110, ruled line structure extractor 112, a document type identifier 114, postprocessor 116 and a document table 120 have been added. The character recognizer 2 is identical to the arrangement of FIG. 2.

FIG. 40 is a diagram showing an example of the document table 120. In FIG. 40, each of the records of the document table 120 comprises a document type ID; a ruled line (or frame) structure which is used for an identification of the document type; a character read area which indicates the area where a character sequence to be recognized exists; and possible character strings. The possible character strings are a list of character strings that may be written in the character read area.

In operation, a document including ruled lines and character sequences is optically read, digitized into a two-level (i.e., black-and-white) image, and stored in RAM 93. The ruled line extractor 110 extracts the ruled lines in the stored document image. From the extracted ruled lines, the ruled line (or frame) structure extractor 112 extracts structural features such as structures of the outer frame and structures inside the outer frame. The document type identifier 114 finds a record whose ruled line structure field contents match the extracted structural features to pass the document type ID and data defining the character read area of the found document type to the character recognizer 2. In this case, only the document type ID may be passed to the recognizer 2 because the recognizer 2 can get such information by using the document ID. Responsively, the character recognizer 2 recognizes the characters written in the character read area as described in the first embodiment. The recognizer 2 outputs a recognized character sequence.

The postprocessor 116 makes a test to see if the recognized character sequence matches any of the possible character strings of a record identified by the document type ID. If so, the postprocessor 116 outputs the character sequence from the recognizer 2 as it is. If the postprocessor 116 fails the test, then the recognizer 2 outputs the character string most similar to the received character sequence in the possible character string field. By doing this, it is possible to enhance the recognition precision.

It should be noted that the character sequences that are possible to a character read area of a document are stored in the record associated with the document. This enables a higher-speed matching of a first recognized character with the prepared character sequences.

Figures 41, 43:
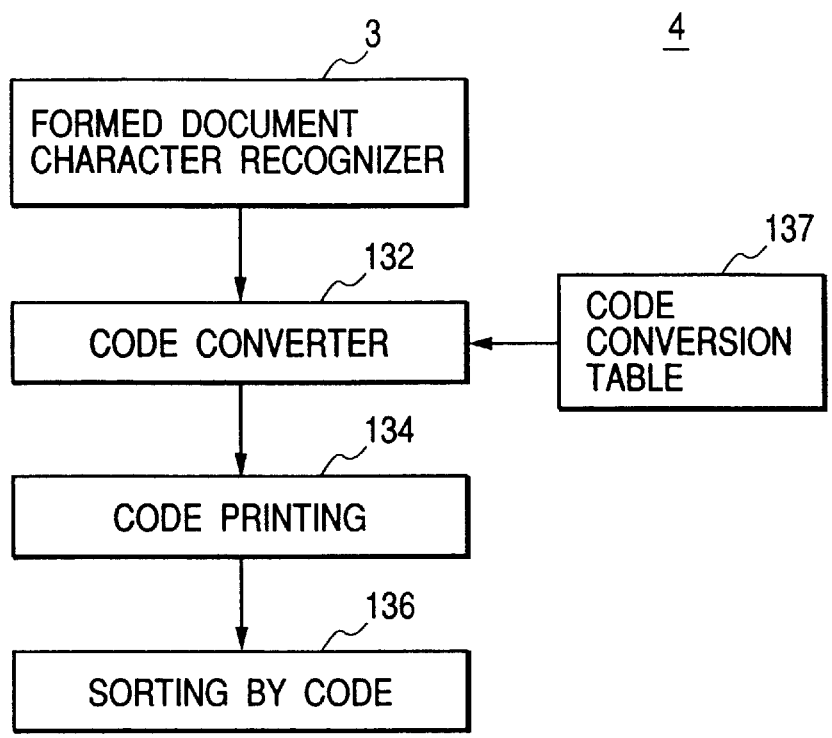
FIG. 41 is a schematic block diagram showing an arrangement of an automatic formed document processor incorporating the character recognition system 3.
FIG. 43 is a diagram showing an exemplary character pattern for describing the way of detecting a loop on the basis of grand label information.

Further, this character recognition system 3 is applicable to an automatic formed document processor. FIG. 41 is a schematic block diagram showing an arrangement of an automatic formed document processor incorporating the character recognition system 3. In FIG. 41, the document processor 41 comprises the character recognition system 3, a code converter 132, a code printing means 134, a sorter 136, and a code conversion table 137. The conversion table 137 contains a set of character data the recognizer 3 outputs and corresponding codes. The codes may be of any kind including bar codes.

In operation, the character recognizer 3 reads an entry form to output a recognized character sequence, e.g., an address. The code converter 132 obtains a code associated with the recognized character sequence (e.g., the address). The printing means 134 prints the obtained code at a printing position on the entry form. The printing position is preferably contained in the record of the document table 120. The sorter 136 performs a sort process.

Modifications

Figure 42:
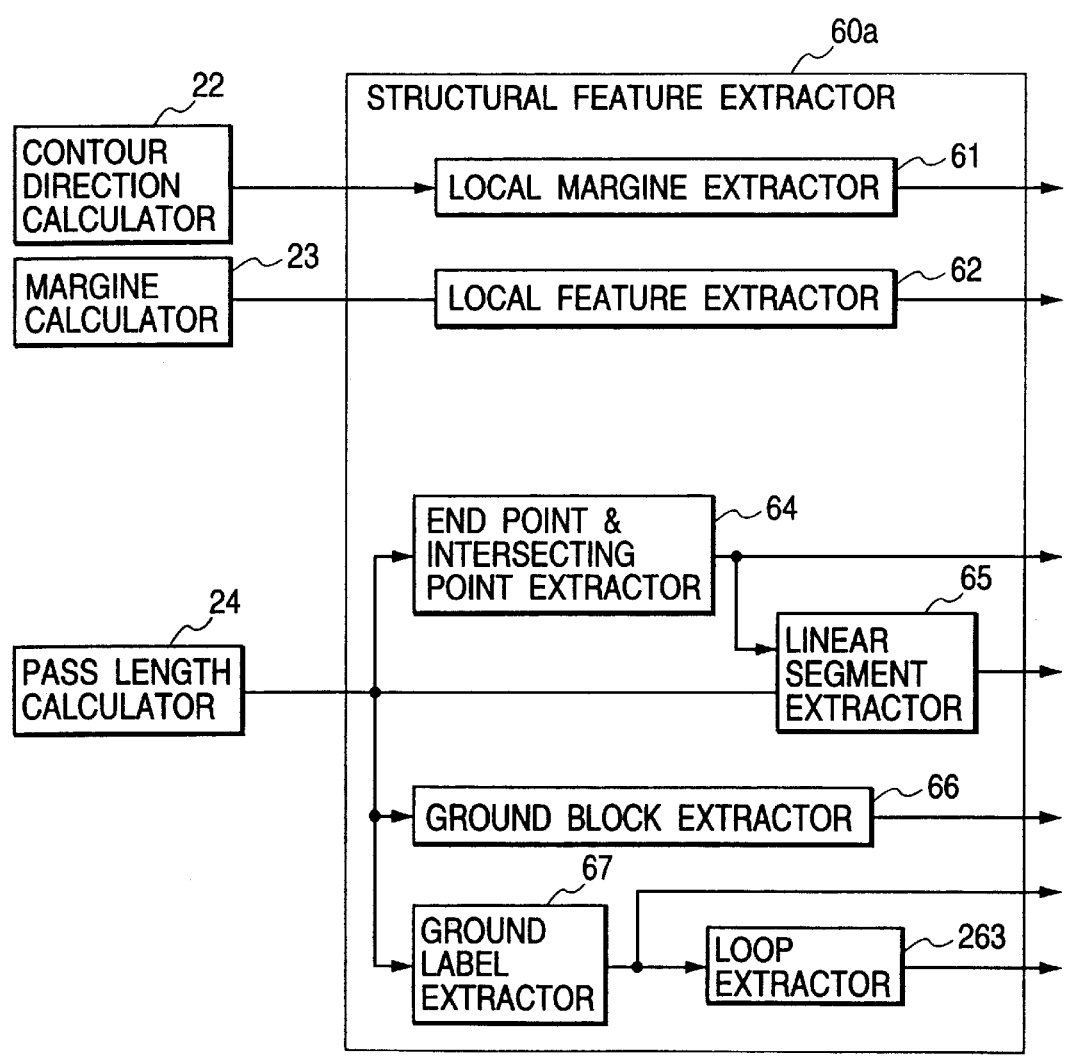
FIG. 42 is a block diagram showing an arrangement of a structural feature extractor 60a according to another illustrative embodiment of the onvention.

FIG. 42 is a block diagram showing an arrangement of a STRUCTURAL FEATURE EXTRACTOR 60a according to another illustrative embodiment of the invention. The structural feature extractor 60a of FIG. 42 is identical to that of FIG. 5 except that the loop extractor 63 has been eliminated and a loop extractor 263 has been inserted in the output line of the ground label extractor 67.

FIG. 43 is a diagram showing an exemplary character pattern for describing the way of detecting a loop on the basis of grand label information. In FIG. 43, symbols "+" indicates black pels. An area of the same digits indicates a ground label extracted by the ground label extractor 67 (the digits indicate the label number). The loop extractor 263 extracts, as a stroke loop, a ground label that is not bounded by the bounding box. That is, the ground label "3" (shown meshed) is extracted as a stroke loop. It is noted that noises may be eliminated by extracting a ground label as a loop only if the ground label contains white pels more than a predetermined number. Since loops can be extracted only by using ground label information, the processing becomes more effective.

Structure-Based Final Recognizer II

Figure 44:
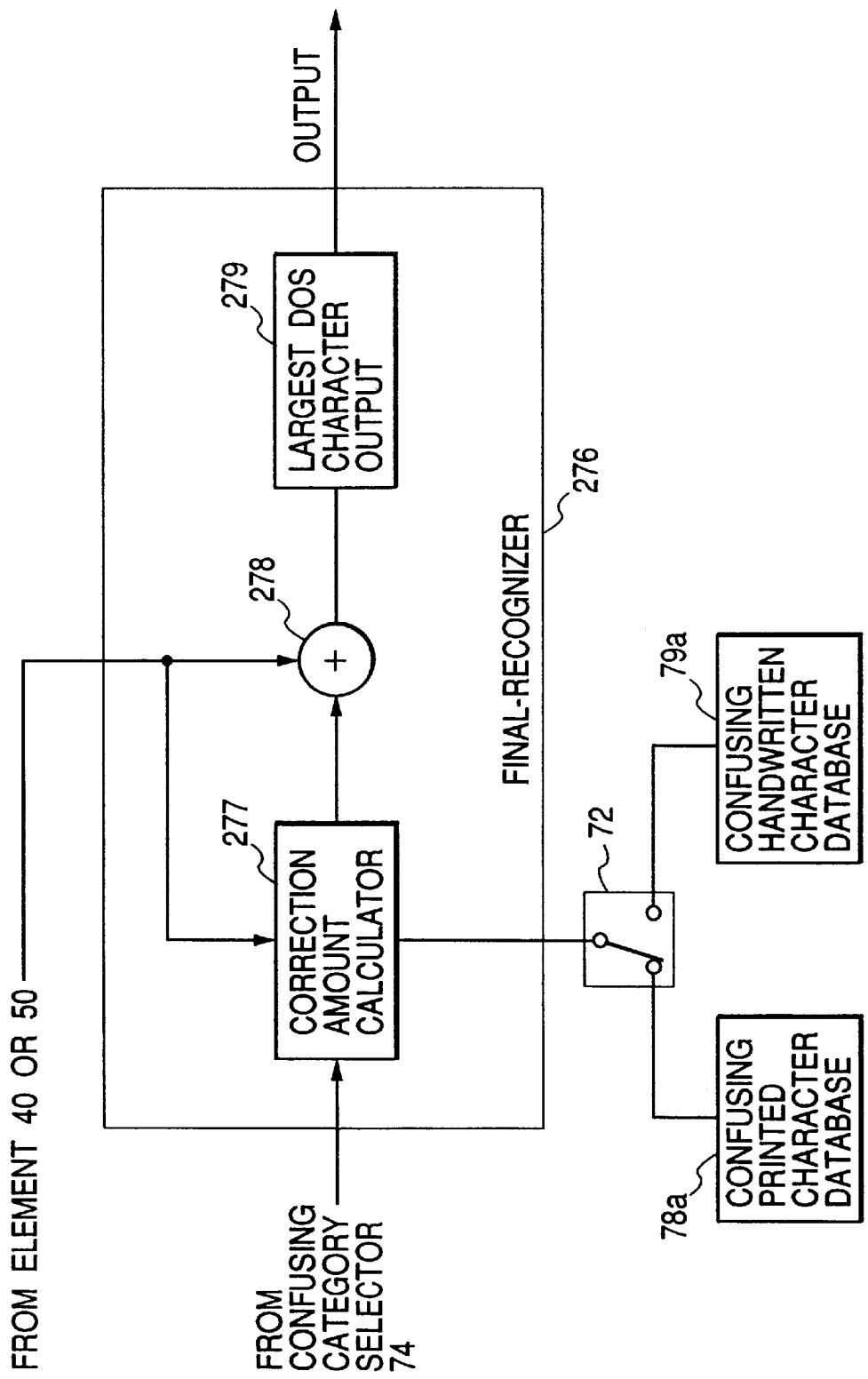
FIG. 44 is a block diagram showing an arrangement of a structure-based final recognizer 276 in accordance with another illustrative embodiment of the invention.

FIG. 44 is a block diagram showing an arrangement of a structure-based final recognizer 276 in accordance with another illustrative embodiment of the invention. As seen from FIG. 44, substituting the recognizer 76 and the confusing character databases 78 and 79 with the corresponding elements 276, 78a and 79a can provide an equivalent character recognition system. The structure-based final recognizer 276 comprises a correction amount calculator 277 for calculating a correction amount for each of the character candidates received from the statistical feature-based recognizer 40 or the reject decision portion 50 by using the structural features from the extractor 60 and the database 78a or 79a; an adder 278 for adding the correction amount and the DOS value of the character candidate to provide a corrected DOS value; and a largest-DOS character output portion 279 for outputs a character with a largest corrected DOS.

Figures 45, 46:
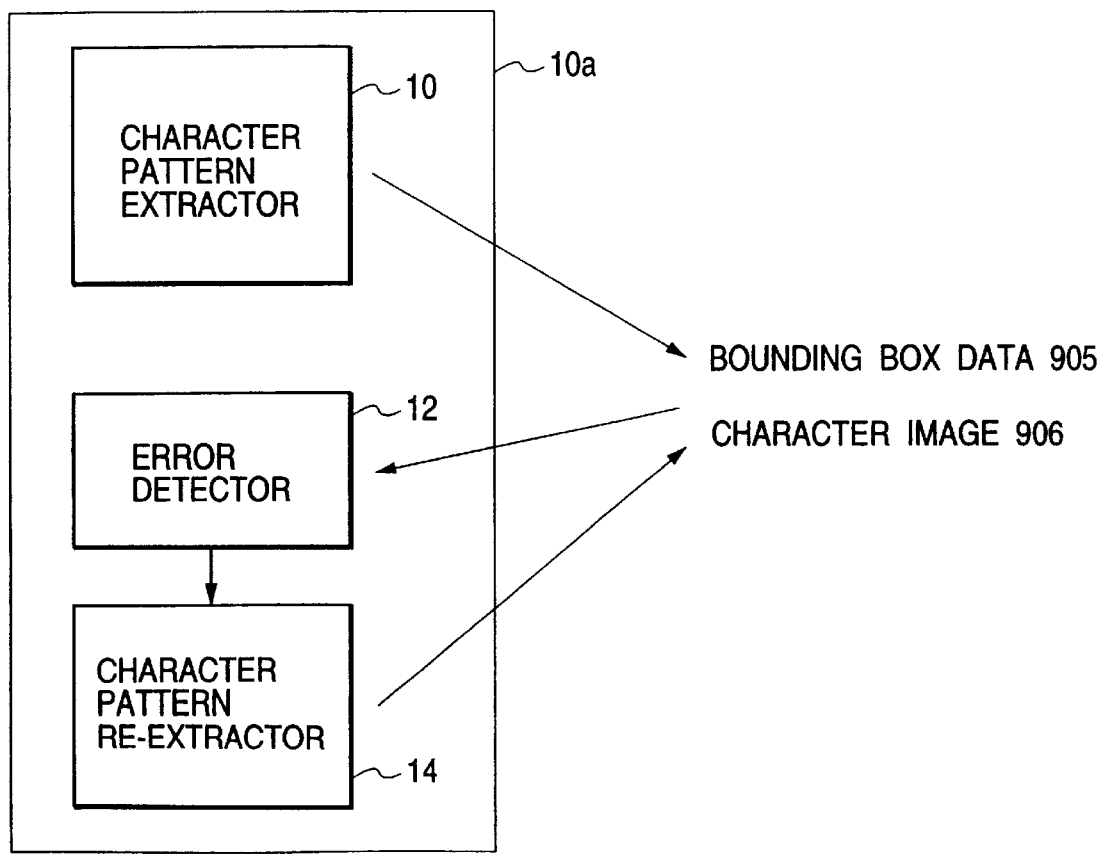

FIG. 45 is a diagram showing an exemplary structure of the confusing character databases 78a and 79a. In FIG. 45, the first two fields 701 and 702 are identical to those of FIG. 34. The databases 78a and 79a has a correction amount finding rule fields 704a. Each correction amount finding rule field contains at least one statement including a condition concerning a relevant structural feature and a correction unit associated with the condition.

The operation of the correction amount calculator 277 is described in the following. The correction amount registers (not shown) for respective characters from the element 40 or 50 is initially set zero. Then, the calculator 277 operates according to the contents of the correction amount finding rule field 704a of the record selected by the confusing category selector 74.

Specifically, if characters "3" and "9" are received as the largest-DOS candidate and the second largest-DOS candidate, features (a), (b) and (c) of FIG. 22 are selected for test from the features output from the extractor 60. A test is made to see if the feature of left margin center projection as shown in FIG. 22(a) has been extracted by the extractor 60. If so, the correction amount of "3" (hereinafter, referred to like "correction amount "3"") is incremented by a unit specified in the correction amount finding rule field 704a. Otherwise, the correction amount of "3" is decremented by the same unit. If the feature of FIG. 22(c), i.e., a left margin lower part projection, has been extracted, the correction amounts "5" and "9" are incremented and, otherwise, decremented. Similarly, if the feature of FIG. 22(b), a right margin upper part projection, has been extracted, the correction amounts "5" and "6" are incremented and, otherwise, decremented. Thus, correction amounts for the candidates are calculated. It is noted that a unit of increment and decrement associated with each structural feature may be either set constant or varied depending on the significance of the features, the distribution of DOSs output from the statistical feature-based recognizer 40 and/or the reliability of features extracted by the extractors 61 through 67.

In just-described example, correction amounts has been calculated for characters other than the characters output from the statistical feature-based recognizer 40. However, the correction amount calculation may be limited only to the characters output from the statistical feature-based recognizer 40.

The adder 278 adds, to the DOS value of each of the character candidates, the corresponding correction amount to provide a corrected DOS value for each character candidate. Then, the largest-DOS character output portion 279 outputs a character with a largest corrected DOS.

If the largest corrected DOS output from the element 279 is smaller than a predetermined value, or if the difference between the largest and the second largest corrected DOS's is too small, a rejection may be made without outputting the largest corrected DOS.

Character Pattern Extractor II

FIG. 46 is a block diagram showing an arrangement of a character pattern extractor 10a in accordance with another illustrative embodiment of the invention. The character pattern extractor 10 of FIG. 1 or 2 can be replaced with the character pattern extractor 10a. In FIG. 46, the extractor 10a comprises the character pattern extractor 10 (this is identical to that of FIG. 1 or 2); an error detector 12; and a character pattern re-extractor 14.

In operation, the character pattern extractor 10 extracts and stores the bounding boxes 905 and corresponding character images 906 in RAM 93. The error detector 12 examines the bounding box data 905 searching for errors.

Figure 47:
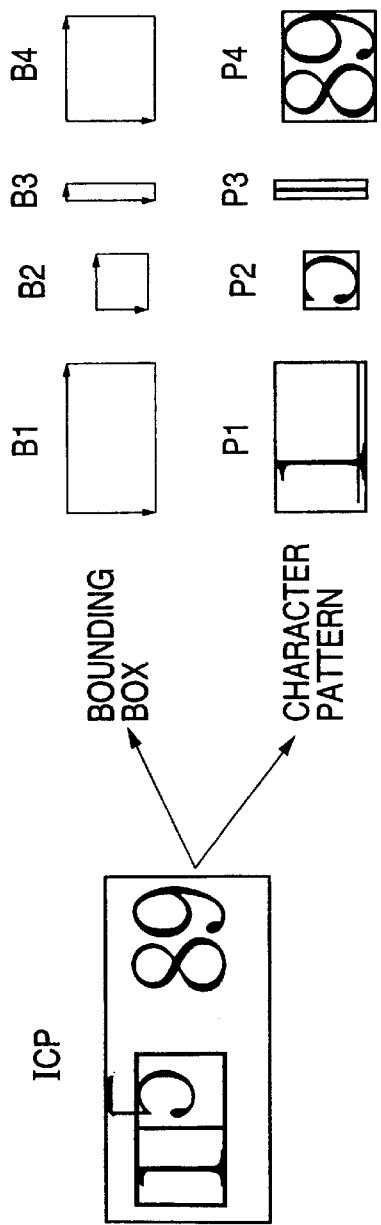
FIG. 47 is a diagram showing how bounding boxes and the corresponding character patterns are erroneously extracted from an input character pattern.

FIG. 47 shows how bounding boxes and the corresponding character patterns are erroneously extracted from an input character pattern (ICP). As shown in FIG. 47, the character pattern extractor 10 may erroneously extract bounding boxes B1 through B4 and corresponding character patterns P1 through P4. Error patterns are as follows; (1) ruled line portion has remained in extracted pattern P1 due to failure in separation (a separation error); a part of a character which overflows a frame has been deleted in extracted pattern P2; a frame segment has been extracted as a character in extracted pattern P3; and neighboring characters has been extracted as a single character in extracted pattern P4.

In order to avoid such errors as just illustrated, the error detector 12 examines the bounding box data 905 and corresponding character images 906 in RAM 93 to see if any one of the characters in the same column or frame is very different in width or height from the other characters, or if a bounding box is very different in width or height from a predetermined bounding box. If so, the error detector 12 supplies the character pattern re-extractor 14 with a re-extraction instructing signal, an error character number and error information indicative of the way of error.

Figure 48:
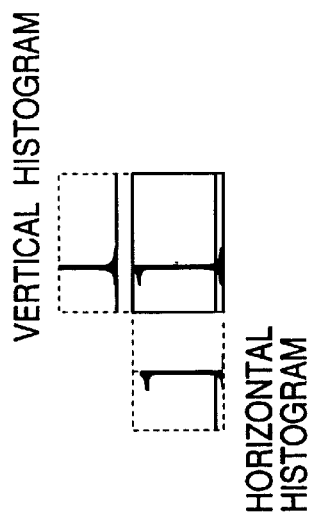
FIG. 48 is a diagram showing horizontal and vertical histograms of black pels.

The character pattern re-extractor 14 responsively execute a re-extraction to an area identified by the error character number according to the error information. For example, the way of error is thought to be a wide width in bounding box B1. Then, the character pattern re-extractor 14 retries an extraction according to horizontal and vertical histograms of black pels as shown in FIG. 48. In this way, extraction errors are reduced in number and degree.

In this embodiment, the error detection is only based on the bounding box data 905 and corresponding character images 906. However, the recognition result may be also used for the error detection. Specifically, if a character with the largest DOS is extremely low as compared with other characters, or if the difference between the largest and the second largest DOS's is too small, then a re-extraction instruction signal and an error character number are preferably sent to the character pattern re-extractor 14. This further reduces the extraction error rate and accordingly the recognition error rate of the system.

Reject Decision Portion II

Figure 49:
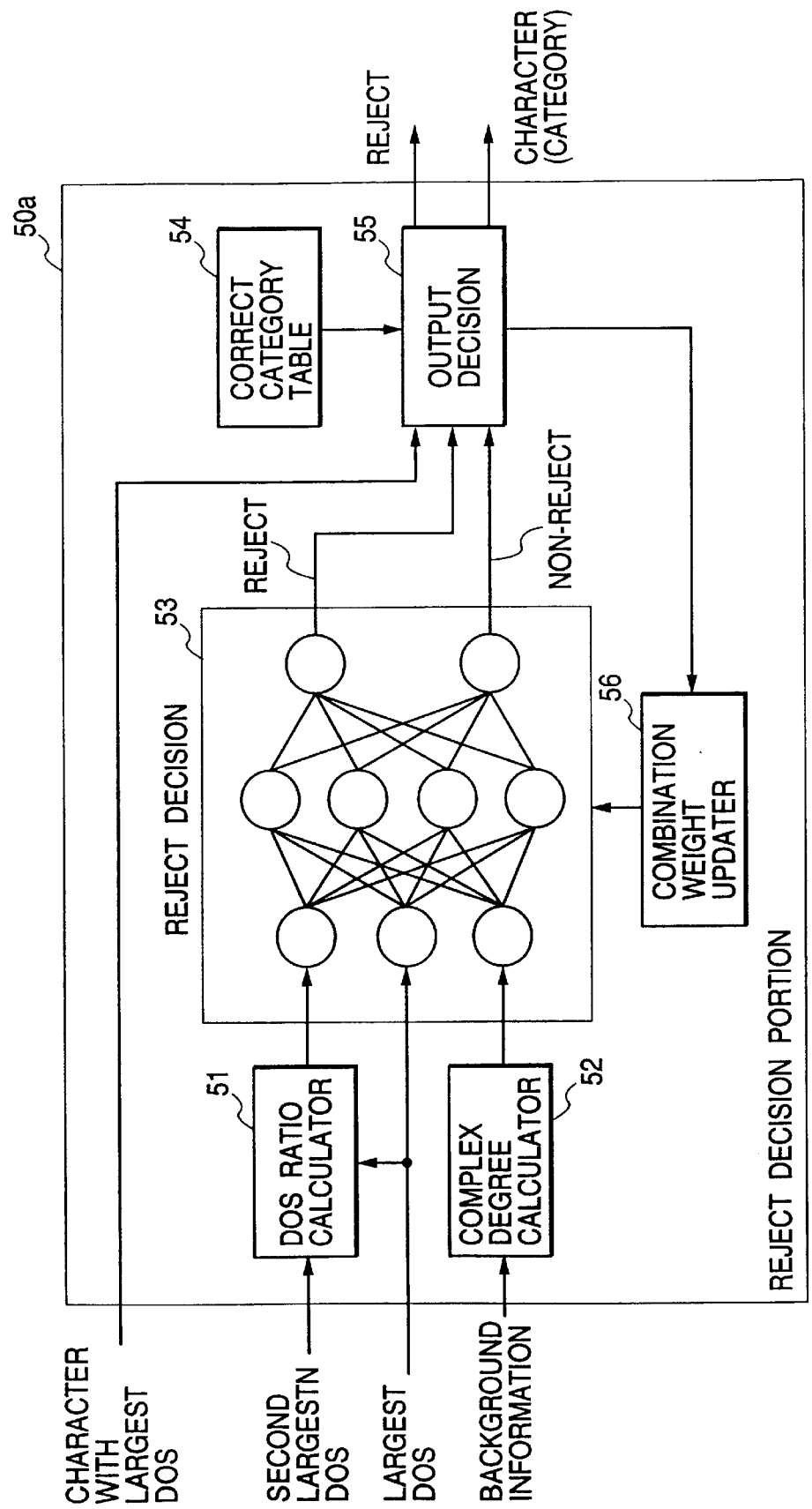
FIG. 49 is a block diagram showing an arrangement of a reject decision portion 50a in accordance with another illustrative embodiment of the invention.

FIG. 49 is a block diagram showing an arrangement of a reject decision portion 50a in accordance with another illustrative embodiment of the invention. In FIG. 49, the reject decision portion 50a comprises a DOS ratio calculator 51; a complex degree calculator 52; a rejection decision portion 53; a correct character (or category) table 54; an output decision portion 55; and a combination weight updater 56. The rejection decision portion 53 comprises a hierarchical neural network that has been trained in advance by using a plurality of data. The reject decision portion 50a has two operation modes; i.e., a training mode and a recognition mode.

In operation, the DOS (degree of similarity) ratio calculator 51 finds a ratio between the second largest DOS and the largest DOS selected from the DOS values from the statistical feature-based recognizer 40. The complex degree (CMD) calculator 52 finds the above described complex degree from background information (e.g., ground path counts) from the path length calculator 24. The CMD was defined as the sum of the largest ground path counts for the four sides. It is noted that the complex degree may be any value concerning the ground paths; e.g., the sum of the ground path counts larger than a predetermined numeral calculated for the four sides of the bounding box. The rejection decision portion 53 (i.e., the hierarchical neural network) receives the DOS ratio, the largest DOS and the complex degree, and provides output signals from the output layer according to the combination weight at the time. The number of neuron of the output layer is assumed to be 2: i.e., one indicates "reject" and the other indicates "non-reject".

In case of the training mode, the output decision portion 55 selects a larger one of the outputs from the reject decision portion 53 and concurrently compares the largest DOS character (or category) of the current character pattern with a correct character output from the correct character table 54. Then, the output decision portion 55 supplies a training signal to the combination weight updater 56 if one of the following conditions is met:

the largest DOS character matches the correct character (recognition success) and the rejection output of the neuron 53 is larger than the other output thereof, or the largest DOS character does not match the correct character (recognition failure) and the non-rejection output of the neuron 53 is larger than the other output thereof.

If the training signal is output, then the combination weight updater 56 updates the combination weight of the hierarchical neural network constituting the reject decision portion 53 by using an algorithm such as the method of steepest decent. The above-described operation is repeated until the training signal is no longer issued for any of the training data or the relation between the two output values of the reject decision portion 53 no longer changes. Executing the training mode enables a reject decision responsive to the DOS ratio, the largest DOS and the complex degree.

If the recognition system is operated in the recognition mode, the output decision portion 55 compares the two outputs from the reject decision portion 53 to output the largest-DOS character if the non-rejection output of the neuron 53 is larger than the other output thereof or a reject signal otherwise.

The boundary between the correctly-recognized character area (the characters not to be rejected) and the erroneously-recognized character area (the characters to be rejected) in the space established by the DOS ratio, the largest DOS and the complex degree is very complicated. Linear separation of such two areas seems to be impossible even in the two-dimension space established by, e.g., the DOS ratio and the largest DOS as seen from FIG. 20. However, the rejection decision portion 50a according to the invention enables a higher-precision and effective reject decision by forming the reject decision portion 53 with a hierarchical neural network, which permits a linear separation, and making the hierarchical neural network learning the above mentioned boundary. It is noted that the reject decision portion 53 may be formed of a neural network model other than a hierarchical neural network. Though this specific embodiment has been configured such that all of the DOS ratio, the largest DOS and the complex degree are input to the reject decision portion 53 in, any one or two of them may be input.

As described above, the present invention enables a higher-precision character recognition through a combination of a statistical feature-based character recognition subsystem and a structural feature-based character recognition subsystem while preventing the system configuration to become complicated by the two subsystems sharing the character extractor 10 and the fundamental feature extractor 20.

The foregoing merely illustrates the principles of the invention. Thus, other variations are possible.

For example, the reject decision portion 50 or 50a may be omitted. In this case, instead of unconditionally supplying the output characters from the statistical feature-based recognizer 40 to the structural feature-based recognizer 70, an output category from the statistical feature-based recognizer 40 may be output as a final result depending on the state of the output category. Further, an arrangement may be made such that the structural feature-based recognizer 70 decides on reject without deciding the final character if the statistical feature-based recognizer 40 has output a recognition pending signal and the recognizer 70 has judged that the character pattern does not fit any character.

The controller 92, RAM 93, the character pattern extractor 10, the fundamental feature extractor 20, the statistical feature extractor 30, the statistical feature-based recognizer 40, the reject decision portion 50, the structural feature extractor 60 and the structural feature-based recognizer 70 may be realized as a single circuit board.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of recognizing characters of a document in a system having means for reading the document and storing read data as an input image of pels, the method comprising:
the step of obtaining said characters from said document;
the step of extracting bounding boxes which contact respective characters in every side and character patterns defined by respective bounding boxes; and
the steps, executed for each of said characters, of:
from said character pattern, extracting contour information and ground information as fundamental features;
extracting at least one kind of statistical features on the basis of said fundamental features;
extracting at least one kind of structural features on the basis of said fundamental features and said character pattern;
on the basis of said extracted statistical features, finding some number of candidates for said character and corresponding degrees of similarity to provide at least such one of said candidates as has largest degree of similarity and degree(s) of similarity associated with said at least one provided candidate;
providing a final candidate for said character pattern on the basis of said at least one provided candidate, said provided degree(s) of similarity, said structural features and said bounding box; and
determining whether said character has been printed or handwritten, on the basis of a size of said bounding box, wherein said step of providing a final candidate includes the step of changing a way of using said structural features.

2. A method of recognizing characters of a document in a system having means for reading the document and storing read data as an input image of pels, the method comprising:
the step of obtaining said characters from said document;
the step of extracting bounding boxes which contact respective characters in every side and character patterns defined by respective bounding boxes; and
the steps, executed for each of said characters, of:
from said character pattern, extracting contour information and ground information as fundamental features;
extracting at least one kind of statistical features on the basis of said fundamental features;
extracting at least one kind of structural features on the basis of said fundamental features and said character pattern;
on the basis of said extracted statistical features, finding some number of candidates for said character and corresponding degrees of similarity to provide at least such one of said candidates as has largest degree of similarity and degree(s) of similarity associated with said at least one provided candidate;
providing a final candidate for said character pattern on the basis of said at least one provided candidate, said provided degree(s) of similarity, said structural features and said bounding box;
wherein said document includes ruled lines;
wherein said step of obtaining said characters from said document includes the step of separating said characters from said ruled lines; and
wherein said system is provided with a table comprising records associated one by one with a plurality of entry forms each having a column that accepts a set of predetermined character strings, each record containing features of said ruled lines, information on said column, and wherein the method further comprises the steps of:
using one of said entry forms for said document;
extracting ruled line features from said input image;
retrieving a record associated with said used entry form through comparison between said ruled line features and said features of ruled lines; and
applying said step of extracting bounding boxes to said column of said retrieved record.

3. A method as defined in claim 2, further comprising the steps of:
collecting all of said final candidates as a recognized character string;
searching said set in said retrieved record for said recognized character string;
in response to a success in said searching said set, using said recognized character string; and
in response to a failure in said searching said set, using a most similar one of said predetermined character strings.

4. A system for recognizing characters of a document, the system comprising:
means for reading said document and storing read data as an input image of pels;
means for obtaining said characters from said document;
means, operative for each character, for extracting a bounding box and a corresponding character pattern defined by said bounding box,
means for extracting contour information and ground information as fundamental features from said character pattern;

means for extracting at least one kind of statistical features on the basis of said fundamental features;

structural feature extracting means for extracting at least one kind of structural features on the basis of said fundamental features and each character pattern;

means, based on said extracted statistical features, for finding some number of candidates for said character and corresponding degrees of similarity to provide at least such one of said candidates as has largest degree(s) of similarity and degree(s) of similarity associated with said at least one provided candidate;

means for providing a final candidate for each character pattern on the basis of said at least one provided candidate, said provided degree(s) of similarity, said structural features and each bounding box;

wherein said means for providing a final candidate comprises:

means for obtaining a set of criterions concerning relevant one(s) of said extracted structural features, said set of criterions being associated with at least one of said provided candidate(s) and said provided degree(s) of similarity from said means for finding some number of candidates; and means, based on said set of criterions, for examining said relevant structural features to select said final candidate;

means for storing confusing provided patterns and associated set of criterions, a provided pattern being a whole of said provided candidate(s) and said provided degree(s) of similarity from said means for finding some number of candidates, and wherein means for obtaining a set of criterions comprises means for obtaining said set of criterions from said storing means through a predetermined access path; and first means which is a version of said storing means which version is dedicated to printed characters;

second means which is a version of said storing means which version is dedicated to handwritten characters;

means for judging, from sizes of said bounding boxes, whether said characters are printed or handwritten; and means, disposed in said predetermined access path, for connecting said means for obtaining from said storing means to one of said first and second means according to said judging means.

5. A system for recognizing characters of a document, the system comprising:

means for reading said document and storing read data as an input image of pels;

means for obtaining said characters from said document;

means, operative for each character, for extracting a bounding box and a corresponding character pattern defined by said bounding box, means for extracting contour information and ground information as fundamental features from said character pattern;

means for extracting at least one kind of statistical features on the basis of said fundamental features;

structural feature extracting means for extracting at least one kind of structural features on the basis of said fundamental features and each character pattern;

means, based on said extracted statistical features, for finding some number of candidates for said character and corresponding degrees of similarity to provide at least such one of said candidates as has largest degree(s) of similarity and degree(s) of similarity associated with said at least one provided candidate;

means for providing a final candidate for each character pattern on the basis of said at least one provided candidate, said provided degree(s) of similarity, said structural features and each bounding box;

wherein said means for providing a final candidate comprises:

means for obtaining a set of criterions concerning relevant one(s) of said extracted structural features, said set of criterions being associated with at least one of said provided candidate(s) and said provided degree(s) of similarity from said means for finding some number of candidates; and means, based on said set of criterions, for examining said relevant structural features to select said final candidate;

wherein said means for examining said relevant structural features to select said final candidate comprises:

means for correcting said provided degree(s) of similarity into corrected degree(s) of similarity on the basis of said at least one provided candidate, said provided degree(s) of similarity, said structural features and said bounding box; and means for selecting a candidate that has a largest corrected degree of similarity as said final candidate; and wherein means for correcting said provided degree(s) of similarity comprises:

means, responsive to an examination of each of said relevant structural features, for calculating correction amounts for by incrementing or decrementing zero-preset correction amount register(s) of character(s) associated with respective relevant structural features; and means for adding, to each of said provided degree(s) of similarity, said correction amount of a candidate associated with said each of said provided degree(s).

6. A system for recognizing characters of a document, the system comprising:

means for reading said document and storing read data as an input image of pels;

means for obtaining said characters from said document;

means, operative for each character, for extracting a bounding box and a corresponding character pattern defined by said bounding box, means for extracting contour information and ground information as fundamental features from said character pattern;

means for extracting at least one kind of statistical features on the basis of said fundamental features;

structural feature extracting means for extracting at least one kind of structural features on the basis of said fundamental features and each character pattern;

means, based on said extracted statistical features, for finding some number of candidates for said character and corresponding degrees of similarity to provide at least such one of said candidates as has largest degree(s) of similarity and degree(s) of similarity associated with said at least one provided candidate;

means for providing a final candidate for each character pattern on the basis of said at least one provided candidate, said provided degree(s) of similarity, said structural features and each bounding box; and means for determining whether said character has been printed or handwritten, on the basis of a size of said bounding box, wherein said means for providing a final candidate includes means for changing a way of using said structural features.

7. A system for recognizing characters of a document, the system comprising:

means for reading said document and storing read data as an input image of pels;

means for obtaining said characters from said document;

means, operative for each character, for extracting a bounding box and a corresponding character pattern defined by said bounding box, means for extracting contour information and ground information as fundamental features from said character pattern;

means for extracting at least one kind of statistical features on the basis of said fundamental features;

structural feature extracting means for extracting at least one kind of structural features on the basis of said fundamental features and each character pattern;

means, based on said extracted statistical features, for finding some number of candidates for said character and corresponding degrees of similarity to provide at least such one of said candidates as has largest degree(s) of similarity and degree(s) of similarity associated with said at least one provided candidate;

means for providing a final candidate for each character pattern on the basis of said at least one provided candidate, said provided degree(s) of similarity, said structural features and each bounding box;

means for providing a reject signal if it is determined that said provided candidates are not reliable from a ratio between a largest degree of similarity and a second largest degree of similarity and a complex degree which indicates a complexity of said character pattern and calculated from ground information, said ground information being one of said structural features; and means for providing said provided candidates as they are if said reject signal is provided;

wherein said means for providing a reject signal comprises means for providing a reject signal if said largest degree of similarity is smaller than a first predetermined threshold, if a ratio of said second largest degree of similarity to said largest degree of similarity is larger than a second predetermined threshold, or if said complex degree is larger then a third predetermined threshold.

8. A system as defined in claim 7, wherein said means for providing a reject signal comprises:

a hierarchical neural network for providing a first output and a second output; and decision means for asserting said reject signal if said first output is higher in level than said second output and disasserting said reject signal otherwise, and wherein decision means includes means, having an input terminal for receiving said provided candidates, for outputting said provided candidates only if said reject signal is asserted.

9. A system as defined in claim 8, further comprising;

means for storing a training set of characters; and means for training said hierarchical neural network by using said training set of characters such that, for each of said training set characters, said reject signal is asserted if a candidate of said largest degree of similarity coincides with said each of each of said training set characters and disasserted otherwise.

10. A system for recognizing characters of a document, the system comprising:

means for reading said document and storing read data as an input image of pels;

means for obtaining said characters from said document;

means, operative for each character, for extracting a bounding box and a corresponding character pattern defined by said bounding box, means for extracting contour information and ground information as fundamental features from said character pattern;

means for extracting at least one kind of statistical features on the basis of said fundamental features;

structural feature extracting means for extracting at least one kind of structural features on the basis of said fundamental features and each character pattern;

means, based on said extracted statistical features, for finding some number of candidates for said character and corresponding decrees of similarity to provide at least such one of said candidates as has largest degree(s) of similarity and degree(s) of similarity associated with said at least one provided candidate;

means for providing a final candidate for each character pattern on the basis of said at least one provided candidate, said provided degree(s) of similarity, said structural features and each bounding box;

wherein said document includes ruled lines;

wherein said step of obtaining said characters from said document includes the step of separating said characters from said ruled lines; and wherein said system is provided with a table comprising records associated one by one with a plurality of entry forms each having a column that accepts a set of predetermined character strings, each record containing features of said ruled lines, information on said column and set of predetermined character strings, wherein one of said entry forms is used for said document, and wherein the system further comprises:

means for extracting ruled line features from said input image;

means for retrieving a record associated with said used entry form through comparison between said ruled line features and said features of ruled lines; and means for applying said means for extracting bounding boxes to said column of said retrieved record.

11. A system as defined in claim 10, further comprising:

means for searching said set in said retrieved record for a recognized character string comprising a collection of all of said final candidates;

means, responsive to a success in said searching said set, for using said recognized character string; and means, responsive to a failure in said searching said set, for using a most similar one of said predetermined character strings.

12. A system for recognizing characters of a document, the system comprising:

means for reading said document and storing read data as an input image of pels;

means for obtaining said characters from said document;

means, operative for each character, for extracting a bounding box and a corresponding character pattern defined by said bounding box, means for extracting contour information and ground information as fundamental features from said character pattern;

means for extracting at least one kind of statistical features on the basis of said fundamental features;

structural feature extracting means for extracting at least one kind of structural features on the basis of said fundamental features and each character pattern;

means, based on said extracted statistical features, for finding some number of candidates for said character and corresponding degrees of similarity to provide at least such one of said candidates as has largest degree(s) of similarity and degree(s) of similarity associated with said at least one provided candidate; and means for providing a final candidate for each character pattern on the basis of said at least one provided candidate, said provided degree(s) of similarity, said structural features and each bounding box;

wherein said means for extracting contour information and ground information as fundamental features comprises:

means for extracting contour pels constituting a contour of said extracted character pattern;

contour direction finding means for finding one of predetermined contour directions for each contour pel from a state of neighboring pels of said each contour pel;

margin finding means for calculating a distance, along each pel line, from each side of said bounding box to a first pel of said character pattern; and ground path finding means for calculating, along each pel line from each side to an opposing side of said bounding box, coordinates of a start pel and an end pel of each of ground paths and a number of said ground paths, each of said ground paths comprising a consecutive ground (i.e., white) pel string.

13. A system as defined in claim 12, wherein said structural feature extracting means includes means for extracting a local margin feature on the basis of output data from said margin finding means.

14. A system as defined in claim 12, wherein said structural feature extracting means includes means for extracting a local shape on the basis of output data from said contour direction finding means.

15. A system as defined in claim 12, wherein said structural feature extracting means includes means for extracting end point(s) and intersecting point(s) on the basis of output data from said ground path finding means.

16. A system as defined in claim 15, wherein said structural feature extracting means further includes means for extracting a straight segment of said contour on the basis of output data from said ground path finding means and said extracted end and intersecting points.

17. A system as defined in claim 16, wherein said straight segment extracting means comprises:

means for extracting consecutive black pel lines that exceed a predetermined threshold value on the basis of said output data from said ground path finding means to obtain areas each comprising extracted adjacent lines;

means for selecting, as line candidates, area(s) of said obtained areas that comprise more pel lines than a predetermined line count; and means for judging whether each of said line candidates is a line segment or not on the basis of said extracted end and intersecting points.

18. A system as defined in claim 15, wherein said end point and intersecting point extracting means comprises:

means for extracting end point candidate(s) and intersecting point candidate(s) on the basis of said output data from said ground path finding means; and means for selecting said end point(s) and intersecting point(s) from said extracted candidates by eliminating inappropriate candidate(s) through comparison of geometrical relations among said extracted candidates.

19. A system as defined in claim 12, wherein said structural feature extracting means includes means for extracting ground blocks, and a size data and a bounding area defining data of each of said ground blocks, each ground block comprising adjacent ground paths of the same order.

20. A system as defined in claim 12, wherein said structural feature extracting means includes means for extracting ground labels of adjacent white pels, and storing a label number attached to each ground label, a size data and a bounding area defining data of each ground label, information indicative of whether each ground label contacts with the bounding box of the character pattern and bounding box side(s) with which each ground label contacts.

21. A system as defined in claim 20, wherein said structural feature extracting means includes means for extracting a loop on the basis of output data from said ground label extracting means.

22. A system as defined in claim 12, wherein said structural feature extracting means includes means for extracting a loop on the basis of output data from said contour direction finding means and said extracted character pattern.

23. A system for recognizing characters of a document, the system comprising:

means for reading said document and storing read data as an input image of pels;

means for obtaining said characters from said document;

means, operative for each character, for extracting a bounding box and a corresponding character pattern defined by said bounding box, means for extracting contour information and ground information as fundamental features from said character pattern;

means for extracting at least one kind of statistical features on the basis of said fundamental features;

structural feature extracting means for extracting at least one kind of structural features on the basis of said fundamental features and each character pattern;

means, based on said extracted statistical features, for finding some number of candidates for said character and corresponding degrees of similarity to provide at least such one of said candidates as has largest degree(s) of similarity and degree(s) of similarity associated with said at least one provided candidate;

means for providing a final candidate for each character pattern on the basis of said at least one provided candidate, said provided degree(s) of similarity, said structural features and each bounding box;

wherein said means for extracting at least one kind of statistical features includes:

means for dividing said extracted character pattern into upper and lower two areas;

means for dividing said extracted character pattern into a left area and a right area;

wherein said means for extracting at least one kind of statistical features further includes:

means for counting, for each of four blocks divided by said two dividing means, contour pels of an identical contour direction category to provide a pel-count-by-contour-direction for each block, said counting being performed for each of predetermined contour direction categories; and means for dividing said pel-count-by-contour-direction by a size of said each block to provide a normalized pel-count-by-contour-direction.

24. A system for recognizing characters of a document, the system comprising:

means for reading said document and storing read data as an input image of pels;

means for obtaining said characters from said document;

means, operative for each character, for extracting a bounding box and a corresponding character pattern defined by said bounding box, means for extracting contour information and around information as fundamental features from said character pattern;

means for extracting at least one kind of statistical features on the basis of said fundamental features;

structural feature extracting means for extracting at least one kind of structural features on the basis of said fundamental features and each character pattern;

means, based on said extracted statistical features, for finding some number of candidates for said character and corresponding degrees of similarity to provide at least such one of said candidates as has largest degree(s) of similarity and degree(s) of similarity associated with said at least one provided candidate;

means for providing a final candidate for each character pattern on the basis of said at least one provided candidate, said provided degree(s) of similarity, said structural features and each bounding box;

wherein said means for extracting at least one kind of statistical features includes:

means for dividing said extracted character pattern into upper and lower two areas;

means for dividing said extracted character pattern into a left area and a right area;

wherein said means for extracting at least one kind of statistical features further includes:

means for counting, for each of said upper and said lower areas, contour pels which first appear when horizontal pel lines scanned from each of a left and a right side to an opposing side and have an identical contour direction category to provide an outer-pel-count-by-contour-direction for each scanning direction for each of said upper and said lower areas and for counting, for each of said left and said right areas, contour pels which first appear when vertical pel lines scanned from each of a top and a bottom side to an opposing side and have an identical contour direction category to provide an outer-pel-count-by-contour-direction for each scanning direction for each of said left and said right areas; and means for dividing said outer-pel-count-by-contour-direction by a size of said each area to provide a normalized outer-pel-count-by-contour-direction.

25. A system for recognizing characters of a document, the system comprising:

means for reading said document and storing read data as an input image of pels;

means for obtaining said characters from said document;

means, operative for each character, for extracting a bounding box and a corresponding character pattern defined by said bounding box, means for extracting contour information and ground information as fundamental features from said character pattern;

means for extracting at least one kind of statistical features on the basis of said fundamental features;

structural feature extracting means for extracting at least one kind of structural features on the basis of said fundamental features and each character pattern;

means, based on said extracted statistical features, for finding some number of candidates for said character and corresponding degrees of similarity to provide at least such one of said candidates as has largest degree(s) of similarity and degree(s) of similarity associated with said at least one provided candidate;

means for providing a final candidate for each character pattern on the basis of said at least one provided candidate, said provided degree(s) of similarity, said structural features and each bounding box;

wherein said means for extracting at least one kind of statistical features includes:

means for dividing said extracted character pattern into upper and lower two areas;

means for dividing said extracted character pattern into a left area and a right area;

wherein said means for extracting at least one kind of statistical features further includes:

means calculating a sum of left margins for each of said upper area and said lower area to provide upper and lower left margin sums; calculating a sum of right margins for each of said upper area and said lower area to provide upper and lower right margin sums; calculating a sum of top margins for each of said left area and said right area to provide left and right top margin sums; and calculating a sum of bottom margins for each of said left area and said right area to provide left and right bottom margin sums; and means for dividing each of said margin sums by a size of said each area to provide a normalized margin sum.

26. A system for automatically sorting a plurality of entry forms each including ruled lines and a column that accepts a set of predetermined character strings, the system comprising:

a table comprising records associated one by one with said plurality of entry forms, each record containing features of said ruled lines, data that defines said column and said set of predetermined character strings;

means for reading each of said entry forms and storing read data as an input image of pels;

means for extracting ruled line features from said input image;

means for retrieving a record associated with said used entry form through comparison between said ruled line features and said features of ruled lines;

means for removing said ruled lines from said input image;

means, operative for each character of a character string in an area specified by said data that defines said column of said retrieved record, for extracting a bounding box and a corresponding character pattern defined by said bounding box;

means for extracting contour information and ground information as fundamental features from said character pattern;

means for extracting at least one kind of statistical features on the basis of said fundamental features;

means for extracting at least one kind of structural features on the basis of said fundamental features and each character pattern;

means, based on said extracted statistical features, for finding some number of candidates for said character and corresponding degrees of similarity to provide at least such one of said candidates as has largest degree(s) of similarity and degree(s) of similarity associated with said at least one provided candidate;

means for providing a final candidate for each character pattern on the basis of said at least one provided candidate, said provided degree(s) of similarity, said structural features and each bounding box;

means for searching said set of predetermined character strings in said retrieved record for a recognized character string comprising a collection of said final candidates;

means, responsive to a success in said searching said set, for outputting said recognized character string;

means, responsive to a failure in said searching said set, for outputting a most similar one of said predetermined character strings as said recognized character string;

a conversion table for associating each of said predetermined character strings with a corresponding code;

means for obtaining a code associated with said recognized character string;

means for printing said obtained code at a predetermined position on each of said entry forms; and means for sorting said entry forms by said printed obtained codes.

27. A system as defined in claim 26, wherein said codes are bar codes.

* * * * *